US 7,856,434 B2

(12) United States Patent
Gluzman Peregrine et al.

(10) Patent No.: US 7,856,434 B2
(45) Date of Patent: Dec. 21, 2010

(54) SYSTEM AND METHOD FOR FILTERING RULES FOR MANIPULATING SEARCH RESULTS IN A HIERARCHICAL SEARCH AND NAVIGATION SYSTEM

(75) Inventors: Vladimir Gluzman Peregrine, Chestnut Hill, MA (US); Alexander D. Rosen, Somerville, MA (US); Benjamin S. Scarlet, Groton, MA (US); Andrew Volpe, Boston, MA (US)

(73) Assignee: Endeca Technologies, Inc., Cambridge, MA (US)

( * ) Notice: Subject to any disclaimer, the term of this patent is extended or adjusted under 35 U.S.C. 154(b) by 428 days.

(21) Appl. No.: 11/938,571

(22) Filed: Nov. 12, 2007

(65) Prior Publication Data

US 2009/0125482 A1 May 14, 2009

(51) Int. Cl.
*G06F 7/32* (2006.01)
(52) U.S. Cl. ...................................... 707/722
(58) Field of Classification Search ................. 707/200, 707/707, 722
See application file for complete search history.

(56) References Cited

U.S. PATENT DOCUMENTS

| 4,775,935 A | 10/1988 | Yourick |
| 4,868,733 A | 9/1989 | Fujisawa et al. |

(Continued)

FOREIGN PATENT DOCUMENTS

| EP | 0196064 | 10/1986 |
| EP | 0597630 | 5/1994 |
| EP | 0676705 | 10/1995 |
| EP | 0694829 A1 | 1/1996 |

(Continued)

OTHER PUBLICATIONS

European Search Authority, European Search Report for European Application No. 02773183.5 mailed Oct. 15, 2007.

(Continued)

*Primary Examiner*—James Trujillo
*Assistant Examiner*—Soheila Davanlou
(74) *Attorney, Agent, or Firm*—Lando & Anastasi, LLP

(57) ABSTRACT

A method is disclosed for modifying the results of a search performed in a collection of items by a search and navigation system. The method includes receiving a query from a user interface and determining a navigation state, defined by expressions of attribute-value pairs, based on the received query. The user interface accepts both selecting and deselecting of any of the attribute-value pairs in an expression corresponding to a navigation state to obtain an expression corresponding to a different navigation state, and each selection and deselection forms a new query. The method further includes retrieving, from the collection, items associated with the navigation state to form a set of unmodified search results, the set of unmodified search results having an arrangement for presentation to the user. A rule filter that includes a metadata expression is applied to a set of rules, each rule having a trigger, an action, and metadata. The application of the rule filter to the set of rules includes evaluating the metadata expression of the rule filter based on the metadata of each rule and passing rules for which the metadata expression of the rule filter evaluates as logical true. The trigger of each rule passed by the rule filter is evaluated, and the action of each rule for which the trigger of the rule evaluates as logical true is executed to modify the unmodified search results to form modified search results.

33 Claims, 21 Drawing Sheets

U.S. PATENT DOCUMENTS

| | | |
|---|---|---|
| 4,879,648 A | 11/1989 | Cochran et al. |
| 4,996,642 A | 2/1991 | Hey |
| 5,206,949 A | 4/1993 | Cochran et al. |
| 5,241,671 A | 8/1993 | Reed et al. |
| 5,418,717 A | 5/1995 | Su et al. |
| 5,418,948 A | 5/1995 | Turtle |
| 5,418,951 A | 5/1995 | Damashek |
| 5,440,742 A | 8/1995 | Schwanke |
| 5,485,621 A | 1/1996 | Schwanke |
| 5,544,049 A | 8/1996 | Henderson et al. |
| 5,546,576 A | 8/1996 | Cochrane et al. |
| 5,548,506 A | 8/1996 | Srinivasan |
| 5,590,269 A | 12/1996 | Kruse et al. |
| 5,600,829 A | 2/1997 | Tsatalos et al. |
| 5,630,125 A | 5/1997 | Zellweger |
| 5,634,128 A | 5/1997 | Messina |
| 5,644,740 A | 7/1997 | Kiuchi |
| 5,671,404 A | 9/1997 | Lizee et al. |
| 5,675,784 A | 10/1997 | Maxwell et al. |
| 5,696,916 A | 12/1997 | Yamazaki et al. |
| 5,706,497 A | 1/1998 | Takahashi et al. |
| 5,715,444 A | 2/1998 | Danish et al. |
| 5,724,571 A | 3/1998 | Woods |
| 5,740,425 A | 4/1998 | Povilus |
| 5,749,081 A | 5/1998 | Whiteis |
| 5,764,975 A | 6/1998 | Taniguchi et al. |
| 5,768,578 A | 6/1998 | Kirk et al. |
| 5,768,581 A | 6/1998 | Cochran |
| 5,787,422 A | 7/1998 | Tukey et al. |
| 5,812,998 A | 9/1998 | Tsutsumi et al. |
| 5,819,273 A | 10/1998 | Vora et al. |
| 5,835,905 A | 11/1998 | Pirolli et al. |
| 5,852,822 A | 12/1998 | Srinivasan et al. |
| 5,864,845 A | 1/1999 | Voorhees et al. |
| 5,864,846 A | 1/1999 | Voorhees et al. |
| 5,864,863 A | 1/1999 | Burrows |
| 5,870,746 A | 2/1999 | Knutson et al. |
| 5,873,075 A | 2/1999 | Cochrane et al. |
| 5,875,440 A | 2/1999 | Cooperman et al. |
| 5,875,446 A | 2/1999 | Brown et al. |
| 5,878,423 A | 3/1999 | Anderson et al. |
| 5,893,104 A | 4/1999 | Srinivasan et al. |
| 5,895,470 A | 4/1999 | Pirolli et al. |
| 5,897,639 A | 4/1999 | Greef et al. |
| 5,920,859 A | 7/1999 | Li |
| 5,924,105 A | 7/1999 | Punch, III et al. |
| 5,926,811 A | 7/1999 | Miller et al. |
| 5,940,821 A | 8/1999 | Wical |
| 5,943,670 A | 8/1999 | Prager |
| 5,950,189 A | 9/1999 | Cohen et al. |
| 5,970,489 A | 10/1999 | Jacobson et al. |
| 5,978,788 A | 11/1999 | Castelli et al. |
| 5,978,794 A | 11/1999 | Agrawal et al. |
| 5,978,799 A | 11/1999 | Hirsch |
| 5,983,219 A | 11/1999 | Danish et al. |
| 5,983,220 A | 11/1999 | Schmitt |
| 5,983,223 A | 11/1999 | Perlman |
| 5,986,655 A | 11/1999 | Chiu et al. |
| 5,987,468 A | 11/1999 | Singh et al. |
| 5,987,470 A | 11/1999 | Meyers et al. |
| 5,991,751 A | 11/1999 | Rivette et al. |
| 5,991,756 A | 11/1999 | Wu |
| 6,006,217 A | 12/1999 | Lumsden |
| 6,006,218 A | 12/1999 | Breese et al. |
| 6,006,222 A | 12/1999 | Culliss |
| 6,006,225 A | 12/1999 | Bowman et al. |
| 6,009,424 A | 12/1999 | Lepage et al. |
| 6,012,006 A | 1/2000 | Ohneda et al. |
| 6,012,066 A | 1/2000 | Discount et al. |
| 6,014,639 A | 1/2000 | Fohn et al. |
| 6,014,655 A | 1/2000 | Fujiwara et al. |
| 6,014,657 A | 1/2000 | Weida et al. |
| 6,014,665 A | 1/2000 | Culliss |
| 6,028,605 A | 2/2000 | Conrad et al. |
| 6,029,195 A | 2/2000 | Herz |
| 6,035,294 A | 3/2000 | Fish |
| 6,038,560 A | 3/2000 | Wical |
| 6,038,574 A | 3/2000 | Pitkow et al. |
| 6,049,797 A | 4/2000 | Guha et al. |
| 6,070,162 A | 5/2000 | Miyasaka et al. |
| 6,092,049 A | 7/2000 | Chislenko et al. |
| 6,094,650 A | 7/2000 | Stoffel et al. |
| 6,112,186 A | 8/2000 | Bergh et al. |
| 6,144,958 A | 11/2000 | Ortega et al. |
| 6,167,368 A | 12/2000 | Wacholder |
| 6,167,397 A | 12/2000 | Jacobson et al. |
| 6,212,517 B1 | 4/2001 | Sato et al. |
| 6,226,745 B1 | 5/2001 | Wiederhold |
| 6,236,985 B1 | 5/2001 | Aggarwal et al. |
| 6,236,987 B1 | 5/2001 | Horowitz et al. |
| 6,240,378 B1 | 5/2001 | Imanaka et al. |
| 6,240,409 B1 | 5/2001 | Aiken |
| 6,243,713 B1 | 6/2001 | Nelson et al. |
| 6,260,008 B1 | 7/2001 | Sanfilippo |
| 6,263,334 B1 | 7/2001 | Fayyad et al. |
| 6,266,199 B1 | 7/2001 | Gillis et al. |
| 6,266,649 B1 | 7/2001 | Linden et al. |
| 6,269,368 B1 | 7/2001 | Diamond |
| 6,272,507 B1 | 8/2001 | Pirolli et al. |
| 6,289,354 B1 | 9/2001 | Aggarwal et al. |
| 6,301,577 B1 | 10/2001 | Matsumoto et al. |
| 6,317,741 B1 | 11/2001 | Burrows |
| 6,339,767 B1 | 1/2002 | Rivette et al. |
| 6,345,273 B1 | 2/2002 | Cochran |
| 6,356,899 B1 | 3/2002 | Chakrabarti et al. |
| 6,360,227 B1 | 3/2002 | Aggarwal et al. |
| 6,360,277 B1 | 3/2002 | Ruckley et al. |
| 6,363,377 B1 | 3/2002 | Kravets et al. |
| 6,385,602 B1 | 5/2002 | Tso et al. |
| 6,397,221 B1 | 5/2002 | Greef et al. |
| 6,418,429 B1 | 7/2002 | Borovoy et al. |
| 6,424,971 B1 | 7/2002 | Kreulen et al. |
| 6,424,983 B1 | 7/2002 | Schabes et al. |
| 6,429,984 B1 | 8/2002 | Alex |
| 6,446,068 B1 | 9/2002 | Kortge |
| 6,453,315 B1 | 9/2002 | Weissman et al. |
| 6,460,034 B1 | 10/2002 | Wical |
| 6,466,918 B1 | 10/2002 | Spiegel et al. |
| 6,480,843 B2 | 11/2002 | Li |
| 6,483,523 B1 | 11/2002 | Feng |
| 6,490,111 B1 | 12/2002 | Sacks |
| 6,505,197 B1 | 1/2003 | Sundaresan et al. |
| 6,519,618 B1 | 2/2003 | Snyder |
| 6,539,376 B1 | 3/2003 | Sundaresan et al. |
| 6,553,367 B2 | 4/2003 | Horovitz et al. |
| 6,560,597 B1 | 5/2003 | Dhillon et al. |
| 6,563,521 B1 | 5/2003 | Perttunen |
| 6,571,282 B1 | 5/2003 | Bowman-Amuah |
| 6,606,619 B2 | 8/2003 | Ortega et al. |
| 6,611,825 B1 | 8/2003 | Billheimer et al. |
| 6,618,697 B1 | 9/2003 | Kantrowitz et al. |
| 6,628,466 B2 | 9/2003 | Alex |
| 6,633,316 B1 | 10/2003 | Maddalozzo, Jr. et al. |
| 6,633,860 B1 | 10/2003 | Afek et al. |
| 6,633,868 B1 | 10/2003 | Min et al. |
| 6,647,391 B1 | 11/2003 | Smith et al. |
| 6,651,058 B1 | 11/2003 | Sundaresan et al. |
| 6,697,801 B1 | 2/2004 | Eldredge et al. |
| 6,697,998 B1 | 2/2004 | Damerau et al. |
| 6,711,585 B1 | 3/2004 | Copperman et al. |
| 6,735,578 B2 | 5/2004 | Shetty et al. |
| 6,748,371 B1 | 6/2004 | Levanoni et al. |
| 6,763,349 B1 | 7/2004 | Sacco |
| 6,763,351 B1 | 7/2004 | Subramaniam et al. |

| | | | |
|---|---|---|---|
| 6,778,995 B1 | 8/2004 | Gallivan | |
| 6,845,354 B1 | 1/2005 | Kuo et al. | |
| 6,853,982 B2 | 2/2005 | Smith et al. | |
| 6,868,411 B2 | 3/2005 | Shanahan | |
| 6,928,434 B1 | 8/2005 | Choi et al. | |
| 6,947,930 B2 | 9/2005 | Anick et al. | |
| 6,947,936 B1* | 9/2005 | Suermondt et al. | 707/7 |
| 6,978,274 B1 | 12/2005 | Gallivan et al. | |
| 7,035,864 B1 | 4/2006 | Ferrari et al. | |
| 7,062,483 B2 | 6/2006 | Ferrari et al. | |
| 7,072,902 B2 | 7/2006 | Kleinberger et al. | |
| 7,085,771 B2 | 8/2006 | Chung et al. | |
| 7,092,936 B1 | 8/2006 | Alonso et al. | |
| 7,093,200 B2 | 8/2006 | Schreiber et al. | |
| 7,099,885 B2 | 8/2006 | Hellman et al. | |
| 7,149,732 B2 | 12/2006 | Wen et al. | |
| 7,366,721 B1 | 4/2008 | Bennett et al. | |
| 7,389,241 B1 | 6/2008 | Bascom | |
| 7,428,528 B1* | 9/2008 | Ferrari et al. | 707/3 |
| 2001/0044758 A1 | 11/2001 | Talib et al. | |
| 2001/0044837 A1 | 11/2001 | Talib et al. | |
| 2001/0047353 A1 | 11/2001 | Talib et al. | |
| 2001/0049674 A1 | 12/2001 | Talib et al. | |
| 2001/0049677 A1 | 12/2001 | Talib et al. | |
| 2002/0051020 A1 | 5/2002 | Ferrari et al. | |
| 2002/0065857 A1 | 5/2002 | Michalewicz et al. | |
| 2002/0083039 A1 | 6/2002 | Ferrari et al. | |
| 2002/0091696 A1 | 7/2002 | Craft et al. | |
| 2002/0095405 A1 | 7/2002 | Fujiwara | |
| 2002/0099675 A1 | 7/2002 | Agrafiotis et al. | |
| 2002/0147703 A1 | 10/2002 | Yu et al. | |
| 2002/0152204 A1 | 10/2002 | Ortega et al. | |
| 2003/0101187 A1 | 5/2003 | Gaussier et al. | |
| 2003/0110181 A1 | 6/2003 | Schuetze et al. | |
| 2003/0120630 A1 | 6/2003 | Tunkelang | |
| 2003/0217335 A1 | 11/2003 | Chung et al. | |
| 2004/0107197 A1* | 6/2004 | Shen et al. | 707/9 |
| 2004/0117366 A1 | 6/2004 | Ferrari et al. | |
| 2004/0205448 A1 | 10/2004 | Grefenstette et al. | |
| 2004/0243554 A1 | 12/2004 | Broder et al. | |
| 2004/0243557 A1 | 12/2004 | Broder et al. | |
| 2004/0267731 A1* | 12/2004 | Gino Monier et al. | 707/3 |
| 2005/0022114 A1 | 1/2005 | Shanahan et al. | |
| 2005/0097088 A1 | 5/2005 | Bennett et al. | |
| 2005/0108212 A1 | 5/2005 | Karimisetty et al. | |
| 2005/0165780 A1 | 7/2005 | Omega et al. | |
| 2005/0210042 A1 | 9/2005 | Goedken | |
| 2006/0031215 A1 | 2/2006 | Pong Robert | |
| 2006/0224581 A1 | 10/2006 | Sasai | |
| 2007/0150522 A1* | 6/2007 | Stakutis et al. | 707/200 |
| 2008/0104032 A1 | 5/2008 | Sarkar | |

FOREIGN PATENT DOCUMENTS

| | | |
|---|---|---|
| EP | 0795833 | 9/1997 |
| EP | 0827063 | 3/1998 |
| EP | 0918295 | 5/1999 |
| EP | 1050830 | 11/2000 |
| EP | 0 694 829 B1 | 5/2002 |
| GB | 2293667 | 4/1996 |
| GB | 2297179 | 7/1996 |
| JP | 09034901 | 2/1997 |
| JP | 10134063 | 5/1998 |
| JP | 11250107 | 9/1999 |
| JP | 11296547 | 10/1999 |
| WO | 90/04231 | 4/1990 |
| WO | 96/27161 | 9/1996 |
| WO | 97/36251 | 10/1997 |
| WO | 98/20436 | 5/1998 |
| WO | 00/36529 | 6/2000 |
| WO | 01/67225 | 9/2001 |
| WO | 01/67300 | 9/2001 |
| WO | 02/097671 A2 | 12/2002 |
| WO | 03/027902 | 4/2003 |

OTHER PUBLICATIONS

Final Office action mailed on Jan. 7, 2009 for U.S. Appl. No. 11/268,868, filed Nov. 8, 2005.
George Koch and Kevin Loney, "Oracle 8, the Complete Reference," Osborne McGrawHill, p. 68 (1997).
International Search Report and Written Opinion for International Patent Application No. PCt/US07/86150, mailed Jul. 23, 2008.
International Searching Authority, International Search Report for PCT/03/31770, mailed Jun. 29, 2004.
Non Final Office action mailed Feb. 21, 2008 for U.S. Appl. No. 09/961,131, filed Sep. 21, 2001.
Non Final Office Action mailed Jul. 23, 2008 for U.S. Appl. No. 11/271,036, filed Nov. 10, 2005.
Non Final Office Action mailed on Apr. 15, 2008 for U.S. Appl. No. 11/268,868, filed Nov. 8, 2005.
Non final Office Action mailed on Jul. 23, 2008 for U.S. Appl. No. 11/408,797, filed Apr. 20, 2006.
Yahoo Inc., Yahoo!, copyright 1999, http://web.archive.org/web/19991013122821/http://www.yahho.com/, 22 pages.
Agosti, M., et al. "Issues of Data Modelling in Information Retrieval" Electronic Publishing, (1991), vol. 4(4) pp. 219-237.
Allen, R.B., "Retrieval From Facet Spaces" Electronic Publishing (1995), vol. 8(2&3), pp. 247-257.
Allen, R.B., "Two Digital Library Interfaces That Exploit Hierarchical Structure" Electronic Publishing (1995) 8 pages.
Amato, et al., "Region proximity in metric spaces and its use for approximate similarity search", ACM Trans. In. System, (2003), vol. 21(2), pp. 192-227.
Baeza-Yates, et al., "New Approaches to Information Management: Attribute-Centric Data Systems" Proceedings Seventh International Symposium on String Processing and Information Retrieval, (2000), pp. 17-27.
Beaudoin et al., "Cheops: A Compact Explorer for Complex Hierarchies", IEEE, pp. 87-92 (1996).
Bergstrom, "A family of delphi components for case-based reasoning", Proceedings 11th IEEE International Conference on Chicago, (1999), pp. 153-160.
Beyer et al., "When is 'Nearest Neighbor' meaningful", Proceedings of the 7th International Conference on Database Theory, (1999).
Bird et al., "Content-Driven Navigation of Large Databases", The Institution of Electrical Engineers, 1996, pp. 13/1-13/5.
Carey, M. et al., "Info Navigator: A Visualization Tool for Document Searching and Browsing", Proceedings International Conference Distributed Multimedia Systems, (DMS Sep. 2003) pp. 23-28.
Chen et al., "Internet Browsing and Searching: User Evaluations of Category Map and Concept Space Techniques", Wiley InterScience: Journal:Abstract, Jan. 6, 1999.
Chen et al., "Internet Browsing and Searching: User Evaluations of Category Map and Concept Space Techniques," Journal of the American Society for Information Science, vol. 49, pp. 582-603 (1998).
Chen et al., "Object Signatures for Supporting Efficient Navigation In Object-Oriented Databases", Proceeding of the 32nd Hawaii International Conference on System Sciences, IEEE, pp. 502-507 (1997).
Chen et al., "Online Query Refinement on Information Retrieval Systems""A Process Model of Searcher/System Interactions", MID Department, University of Arizona, pp. 115-133 (1990).
Cilibrasi, R. et al., "Automatic Meaning Discovery Using Google", 31 pages, www.bsik-bricks.nl/events/ab/google_abstract.html. www.arxiv.org/abs/cs.CL0412098 (2004).
Diamantini et al., "A conceptual indexing method for content-based retrieval", Database and Expert Systems Applications. Proceedings Tenth Workshop on Florence Italy, (1999), pp. 192-197.
Ellis, GP et al., "HIBROWSE for Hotels: bridging the gap between user and system views of a database", extracts from a paper giving an overview of the HIBROWSE for Hotels application.http://web.archive.org/web/19991109234626"//.hud.ac.uk/school...4 pages.
European Search Authority, European Search Report for European Patent Application No. 01945997.3, dated May 23, 2007, 6 pages.

Fua et al., "Structure-Based Brushes: A Mechanism for Navigating Hierarchically Organized Data and Information Spaces", IEEE Transactions on Visualization and Computer Graphics, vol. 6, No. 2, pp. 150-159, Apr.-Jun. 2000.

Garcia-Molina et al., "The Query Compiler" Database System Implementation, 2000, Prentice Hall, Upper Saddle River, NJ, USA, XP002423997, pp. 329-364.

Gil et al., "A Visual Interface and Navigator for the P/FDM Object Database", Department of Computing Science, University of Aberdeen, IEEE, pp. 54-63 (1999).

Guha et al., "Rock: A robust clustering algorithm for categorical attributes", Data Engineering Proceedings 15th International Conference on Sidney, (1999), pp. 512-521.

Guttman, "R-Trees: A dynamic index structure for spatial searching", Proceedings of the ACM SIG-MOD Conference, (1984).

Han et al., "Join Index Hierarchy: An Indexing Structure for Efficient Navigation in Object-Oriented Databases", IEEE Transactions on Knowledge and Data Engineering, vol. 11, No. 2, pp. 321-337, Mar./Apr. 1999.

Han-Joon, K. et al., "An effective document clustering method using user-adaptable distance metrics.", SAC, (2002), pp. 16-20.

Hearst's Fall 1999 Course, SIMS 202 Information Organization and Retrieval: http://www2.sims.berkeley.edu/course/is202/f99/Lectures.html.

Hearst, M. "Chapter 10: User Interfaces and Visualization", Modern Information Retrieval, Yates and Ribeiro-Neto (1999) pp. 257-340.

Hearst, M. et al., "Using MetaData in Search: Combining Browsing and Search", 39 slides, http://www2.sims.berkeley.edu/courses/is202/f98/Lecture27/sId001.htm.

Hearst, M., et al. "Cat-a Cone: An Interactive Interface for Specifying Searches and Viewing Retrieval Results Using a Large Category Hierarchy" Ann. Int. ACM-SIGIR Conf. On Res. And Dev. In Information Retrieval, (1997) pp. 246-255.

Hinneburg et al., "What is the nearest neighbor in high dimensional spaces", Proceedings of the 26th VLDB Conference, (2000).

Hongyan Jing, "Information retrieval based on context distance and morphology", Proceedings of the 22nd annual international ACM SIGIR conference on Research and Development in information retrieval, pp. 90-96, Aug. 1999.

http://www.searchtools.com/tools/endeca.html, Search Tools Product Report, "Endeca Faceted Metadata Search and Browse", 2 pages, updated Jul. 10, 2003.

Hua et al., "Object Skeletons: An Efficient Navigation Structure for Object-Oriented Database Systems", IEEE, pp. 508-517 (1994).

International Searching Authority, International Search Report for PCT/US2006/043538, mailed Mar. 26, 2007, 12 pages.

Kummamuru et al., "A Hierarchical Monothetic Document Clustering Algorithm for Summarization and Browsing Search Results", WWW2004, pp. 658-665, May 17-22, 2004.

McEneaney, John E., "Visualizing and Assessing Navigation in Hypertext", Hypertext 99, Darmstadt Germany, pp. 61-70 (1999).

Miller et al., "DataWeb: Customizable Database Publishing for the Web" IEEE Multimedia, 4(4):14-21(1997).

Miller et al., "Integrating Hierarchical Navigation and Querying: A User Customizable Solution" ACM Multimedia Workshop on Effective Abstractions in Multimedia Layout, Presentation, and Interaction, San Francisco, CA, Nov. 1995, pp. 0-7.

Miller, Renee J., "Using Schematically Heterogeneous Structures", Department of Computer and Information Science, Ohio State University, 1998, p. 189-200.

Mills, J., "The Problem of arrangement in a Library", A Modern Outline of Library Classification, Chapman & Hall Ltd, pp. 1-8, 1960.

Pedersen, G.S., "A Browser for Bibliographic Information Retrieval Based on an Application of Lattice Theory" Proc. Of the Ann. Int. SCM SIGIR Conference on Res. And Deve. In Information Retrieval, (1993), pp. 270-279.

Pi-Sheng, "Using case-based reasoning for decision support", Proceedings of the 27th Annual Hawaii International Conference on System Sciences, (1994), pp. 552-561.

Pollitt A.S., "Intelligent Interfaces to online Databases", Expert Systems for Information Management, vol. 3, No. 1, pp. 49-69, 1990.

Pollitt et al., "Faceted-Classification as Pre-Coordinated Subject Indexing: Multi-Dimensional Searching for OPAC Users", Oslo College, May 6-7, 1998.

Pollitt et al., "MenUse for Medicine: End-User Browsing and Searching of MEDLINE via the MeSH Thesaurus", Int. Forum Inf. and Docum., pp. 547-573, 1988.

Pollitt et al., "MenUse for Medicine: End-User Browsing and Searching of MEDLINE via the MeSH Thesaurus", Int. Forum Inf. and Docum., vol. 13, No. 4, pp. 11-17, Oct. 1998.

Pollitt et al., "Multilingual access to document databases", CAIS/ACSI '93 Information as a Global Commodity—Communication, Processing and Use, Proceedings of the 21st Annual Conference of the Canadian Association for Information Science, pp. 128-140, Antigonish, Nova Scotia Canada, Jul. 1993.

Pollitt, A. S. et al., "View-based searching systems—a new paradigm for information retrieval based on faceted classification and indexing using mutually constraining knowledge-based views", The Interface Design, 6 pages.

Pollitt, A.S., "A rule-based system as an intermediary for searching cancer therapy literature on MEDLINE", Intelligent Information Systems: Progress and Prospects, pp. 82-126, 1986.

Pollitt, A.S., "An Expert Systems Approach to Document Retrieval, A thesis submitted to the Council for National Academic Awards in partial fulfillment of the requirements for the degree Doctor of Philosophy", May 1986.

Pollitt, A.S., "Expert Systems and the Information Intermediary: Tackling Some of the Problems of Naive End-User Search Specification and Formulation", Intelligent Information Systems for the Information Society, pp. 100-108, 1986.

Pollitt, A.S., Information Storage and Retrieval Systems, Origin, Development and Applications, Ellis Horwood Books in Information Technology, 1989.

Pollitt, A.S., "Reducing complexity by rejecting the consultation model as a basis for the design of expert systems", Expert Systems, vol. 3, No. 4, pp. 234-238, Oct. 1986.

Pollitt, A.S., "Taking a different view", British Library research, Library Technology, vol. 1, Nov. 1, 1996.

Pollitt, A.S., "The key role of classification and indexing in view-based searching", Centre for Database Access Research, University of Huddersfield, UK, Abstract, 8 pages.

Pollitt, et al. "HIBROWSE for Bibliographic Databases" Journal of Information Science, (1994), vol. 20 (6), pp. 413-426.

Pollitt, et al. "View-Based Searching Systems—Progress Towards Effective Disintermediation" Online Information Meeting Proceedings, (1996) pp. 433-445.

Pollitt, Example from EMBASE entitled "Screen Shots from View-based searching with HIBROWSE", (1998).

Pollitt, excerpt from "Prospects for using Dewey Classification in a View-based Searching OPAC Dewey Decimel Classification: Possibilities in View-based Searching OPAC", (1998).

Pollitt, S., "CanSearch: An Expert Systems Approach to Document Retrieval", Information Processing & Management, vol. 23, No. 2, pp. 119-138, (1987).

PriceSCAN.com, Your Unbiased Guide to the Lowest Price on Books, Computers, Electronic,Copyright 1997-1999, <http://web.archive.org/web/19991117123352/http://www.pricescan.com/>, pp. 1-8.

Priss, U. et al., "Utilizing Faceted Structures for Information Systems Design", School of Library and Information Science, Indiana University Bloomington, pp. 1-12.

Ramaswami et al., "Navigating a Protection-Engineering Data Base", IEEE, pp. 27-32, Apr. 1989.

Salton et al., "Term-weighting approaches in automatic test retrieval", Information Processing & Management, (1988), vol. 24(5), pp. 513-523.

Screenshots from "View-based searching with HIBROWSE", http://www.jbi.hio.no/bibin/kurs/korg98/oslo2.ppt, 10 pages.

Shamos et al., "Closest-point problems", Proceedings of the 16th Annual Symposium on Foundations of Computer Science, IEEE (1975).

Story, G.A., et al., "The RightPages Image-Based Electronic Library for Alerting and Browsing" Computer, (1992), vol. 25(9), pp. 17-25.

Treglown, M. et al., "HIBROWSE for Bibliographic Databases: A study of the application of usability techniques in view-based searching", British Library Research and Innovation Report 52, The University of Huddersfield, Apr. 1997.

Tu et al., "Agent Technology for Website Browsing and Navigation", Proceedings of the 32nd Hawaii International Conference on Systems Sciences, IEEE, pp. 1-10, 1999.

Turine et al., "A Navigation-Oriented Hypertext Model Based on Statecharts", Hypertext 97, Southampton UK, 1997.

Velez et al., "Fast and Effective Query Refinement", SIGIR 1997, pp. 6-15.

Weiland et al., "A graphical query interface based on aggregation/generalization hierarchies," Information systems, vol. 18, No. 4, pp. 215-232 (1993).

Xiong et al., "Taper: A Two-Step Approach for All-Strong-Pairs Correlation Query in Large Databases", IEEE Transactions on Knowledge and Data Engineering, vol. 18, No. 4, Apr. 2006, pp. 493-508.

Yahoo 1996 (Exhibit 12-16).

Yahoo!, Copyright 1999 Yahoo! Inc., <http://web.archive.org/web/19991116151216/http://www4.yahoo.com/>.

Yoo et al., "Towards a Relationship Navigation Analysis", Proceedings of the 32nd Hawaii International Conference on System Sciences, IEEE, pp. 1-10, (2000).

* cited by examiner

*201*

| Published Rules Filter | state: published |

| | Rule Name | New Movie Releases |
|---|---|---|
| 210 → | Trigger | Query.Contains_Keyword(DVD) OR Query.Contains_Keyword(VHS) |
| 215 → | Action | Supplement query response with new movie releases in a separate frame. |
| 220 → | Metadata | state=Published |

| | Rule Name | Sorting by Price |
|---|---|---|
| 230 → | Trigger | Query.Contains_Keyword(cheap) |
| 235 → | Action | Sort results by price |
| 240 → | Metadata | state=Published |

FIG. 2C

*Rule Testing* 505

| Testing Rule Filter | <application>?N=0&Nmrf=or(and(state:draft, author:watkins), state:published) |

| Rule Name | Pinot Noir Substitutes |
|---|---|
| Trigger | Navigation_State.Contains_Attribute_Value_Pair({Type/Varietal:Pinot Noir}) |
| Action | Supplement query response with a list of Pinot Grigio wines in a separate frame & add heading "What about white wine?" |
| Metadata | state=draft<br>author=watkins |

510 → Rule Name
515 → Action  
520 → Metadata

FIG. 5B

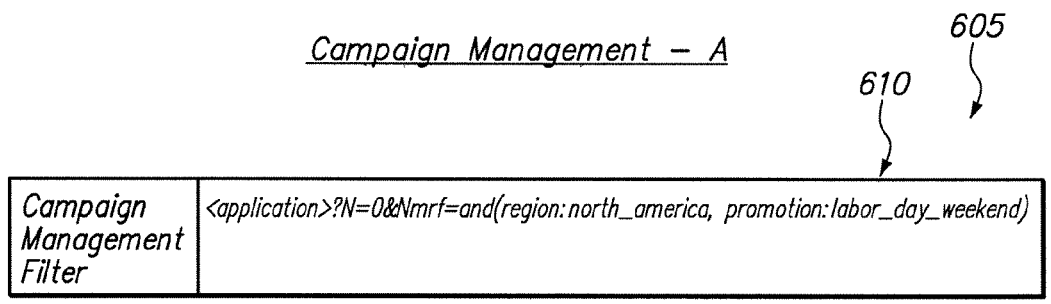

*Campaign Management – A*

| Campaign Management Filter | <application>?N=0&Nmrf=and(region:north_america, promotion:labor_day_weekend) |

*FIG. 6A*

| Rule Name | Labor Day TV Sale |
|---|---|
| Trigger | Query.Contains_Keyword(TVs) |
| Action | Supplement query response with TVs featured in the Set: Labor Day TV Sale |
| Metadata | state=published<br>region=north_america<br>promotion=labor_day_weekend |

*FIG. 6B*

Campaign Management – B

A/B Testing

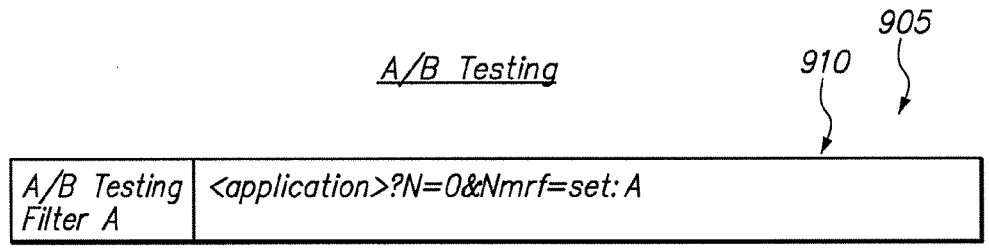

FIG. 9A

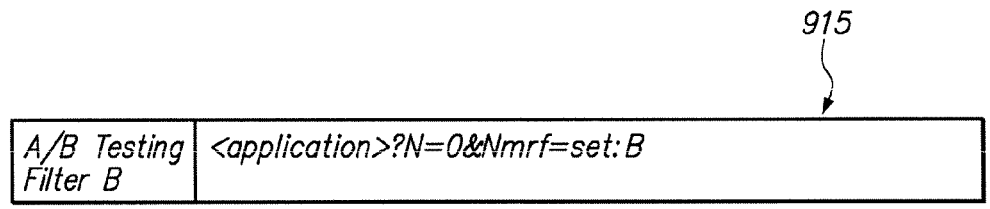

FIG. 9B

| Rule Name | Test Frame |
|---|---|
| Trigger | Query.Contains_Keyword(French) AND Query.Contains_Keyword(wines) |
| Action | Add a separate frame above the results with recommended wine |
| Metadata | state=published<br>set=A |

FIG. 9C

| Rule Name | Test Order |
|---|---|
| Trigger | Query.Contains_Keyword(French) AND Query.Contains_Keyword(wines) |
| Action | Present recommended wine first in the list of results |
| Metadata | state=published<br>set=B |

FIG. 9D

*Rule Filters* 1005

| Administrator View | <application>?N=0&Nmrf=not(state:inactive) |
| --- | --- |
| Promotion | <application>?N=0&Nmrf=or(and(state:draft, promotion: thanksgiving_day), state:published) |
| New York Rules | <application>?N=0&Nmrf=or(and(state:draft, region:new_york), state:published) |
| 4th of July Rules | <application>?N=0&Nmrf=ID:July_4* |

1010 → Promotion
1015 → New York Rules
1025 → 4th of July Rules

FIG. 10

| User Management | |
|---|---|
| Edit User | |

Login Information

- Username: admin — 1110
- New Password: — 1115
- Confirm New Password:

Identity

- First Name: Karen — 1125
- Last Name: Hastings — 1130
- Email Address: khastings@endeca.com — 1135

Permissions — 1140

| ☐ | Action | Description |
|---|---|---|
| ☑ | Approve | May approve changes |
| ☑ | Publish | May publicity changes to productions |
| ☑ | Edit | May edit and create object |
| ☑ | Delete | May delete object |

Access — 1145

| ☐ | Permission | Description |
|---|---|---|
|   | admin | Provides access to the Administration page. |
| ☑ | config | Provides access to the Configuration page. |

| | Add Rule | Audit Rules | | | Approve | Do Not Approve | Inactivate | Delete | |
|---|---|---|---|---|---|---|---|---|---|
| ☐ | Priority | Zone | Status | State | Name | | | Date Created | Date Reviewed | Date Published |
| ☐ | 1 | Zone Three | | Draft | Oregon Pinot Noire | | | 10/15/05 | | |
| ☐ | 2 | Zone One | | Approve | Oregon burgundy wine | | | 10/20/05 | | 10/21/05 | |
| ☐ | 3 | Zone Two | | Not Approved | Highly Recommended | | | 10/20/05 | | 10/22/05 | |
| ☐ | 4 | Zone Two | | Published | Top Rated | | | 10/22/05 | | 10/22/05 | 10/22/05 |

1210 — checkbox column
1215 — Priority column
1220 — row indicator

FIG. 12B (1225)

| | Add Rule | Audit Rules | | | | |
|---|---|---|---|---|---|---|
| ☐ | Priority | State | Zone | Status | Name | Date Created | Date Reviewed | Date Published |
| ☒ | 1 | Approved ▽ | Zone Three | | Oregon Pinot Noire | 10/15/05 | 10/21/05 | |
| ☒ | 2 | Not Approved ▽ | Zone One | | Oregon burgundy wine | 10/20/05 | 10/22/05 | |
| ☒ | 3 | Not Approved ▽ | Zone Two | | Highly Recommended | 10/20/05 | 10/22/05 | |
| ☒ | 4 | Published ▽ | Zone Two | | Top Rated | 10/22/05 | 10/22/05 | 10/22/05 |

1230 — Published dropdown
1235 — checkbox column

Rule: Oregon Pinot Noire

| | |
|---|---|
| Name | Oregon Pinot Noire |
| Zone | Zone Three |
| Style | Style 3 |
| State | Draft |
| Created by | Jane Hastings |
| Date Created | 10/15/05 |
| Reviewed by | |
| Date Reviewed | |

Tabs: General | Where and What | When | Who | Advanced

Done

FIG. 13

Rule List

Add Rule | Audit Rules

| Priority | State | Relative Priority | Zone | Status | Name | Date Created | Date Reviewed | Date Published |
|---|---|---|---|---|---|---|---|---|
| ☐ | | | | | | | | |
| ☒ 1 | Approved | 1 | Zone Three | | Oregon Pinot Noire | 10/15/05 | | |
| ☒ 2 | Not Approved | | Zone One | | Oregon burgundy wine | 10/20/05 | 10/21/05 | |
| ☒ 3 | Not Approved | | Zone Two | | Highly Recommended | 10/20/05 | 10/22/05 | |
| ☒ 4 | Published | | Zone Two | | Top Rated | 10/22/05 | 10/22/05 | 10/22/05 |

Preview Order

Show Filter | | Filter

FIG. 14

Rule List

Rules have been saved.

| Rules | Requests |

[Add Rule]  All States ▽  [Filter] [Clear Filter]

1610 → (Name column)
1625 → (All States dropdown)
1620 → (Filter button)
1615 → (table body)
1605 → (window)

| Delete | Status | Name | Modified | Trigger | Trigger | Zone | State | Active | Preview | Priority ↑ | Copy |
|---|---|---|---|---|---|---|---|---|---|---|---|
| ☒ | | Recommended Merlots | 10/31/2007 | ⊞ Wine Type > Red | ▦ Wine Type > Red > Merlot, Designation > Highly Recommended | Zone One | Inactive | ☐ | ☐ | 1 | 📄 |
| ☒ | | Recommended Pinot Noirs | 10/31/2007 | ⊞ Wine Type > Red | ▦ Wine Type > Red > Pinot Noir, Designation > Highly Recommended | Zone One | Inactive | ☐ | ☐ | 2 | 📄 |
| ☒ | | Recommended Chardonnays | 10/31/2007 | ⊞ Wine Type > White | ▦ Wine Type > White > Chardonnay, Designation > Highly Recommended | Zone One | Inactive | ☐ | ☐ | 3 | 📄 |
| ☒ | | Highly Recommended | 10/31/2007 | ⊞ (No location specified – this rule applies everywhere) | ▦ Designation > Highly Recommended | Zone Two | Inactive | ☐ | ☐ | 4 | 📄 |
| ☒ | | Best Buys | 10/31/2007 | ⊞ (No location specified – this rule applies everywhere) | ▦ Designation > Best Buy | Zone Three | Inactive | ☐ | ☐ | 5 | 📄 |

[Save Changes] [Reset Changes]

FIG.16

Current Navigation Parameters: 1710
Remove  Wine Type > White nav_controls

Additional Query Parameters:

Wine Type
  Chablis
  Chardonnay
  Gewurztraminer
  Pinot Blanc
  Sauvignon Blanc
  Semillon Chardonnay
Region
Vintage
Ratings
Price Range
Review Score
Designation
Characteristics
Body
Flavors
Drinkability nav_range_controls
Range Filter:
property nav_records nav_records_header Matching Records: 23,048

Properties:  [Hide]
Record Rollup: (None)
Record Sort: (Default)
Display Key: P_Name   Set

1705

1 Chardonnay Langhe La Bernardina Da Uve
PROPERTIES:
P_DateReviewed: 12/31/00
P_Description: Ripe, with apple, mango and cream aromas. Full-bodied, with a thick, almost syrupy texture and a long finish. Lacks a bit of acidity, but delicious. Drink now. (1400 cases produced)
P_Name:     Chardonnay Langhe La Bernardina Da Uve
P_Price:    37.000000
P_Region:   Piedmont
P_Score:    85
P_WineID:   82873
P_Winery:   Ceretto
P_WineType: Chardonnay
P_WineType: White
P_Year:     1998
DIMENSION VALUES:
Review Score: 80 to 90

2 Riesling Clare Valley Bin 7
PROPERTIES:
P_DateReviewed: 01/31/99
P_Description: Earthy and mineral flavors show most prominently in the lean, attractive Riesling.

FIG. 17

Rule List

Rules have been saved.

Rules | Requests

All States ▽    [Filter] [Clear Filter]

| Delete | Status | Name | Modified | Trigger | Trigger | Zone | State | Active | Preview | Priority↑ | Copy |
|---|---|---|---|---|---|---|---|---|---|---|---|
| ☒ | | Recommended Merlots | 10/31/2007 | ⊞ Wine Type > Red | 🗋 Wine Type > Red > Merlot, Designation > Highly Recommended | Zone One | Inactive | ☐ | ☐ | 1 | 📄 |
| ☒ | | Recommended Pinot Noirs | 10/31/2007 | ⊞ Wine Type > Red | 🗋 Wine Type > Red > Pinot Noir, Designation > Highly Recommended | Zone One | Inactive | ☐ | ☐ | 2 | 📄 |
| ☒ | | Recommended Chardonnays | 10/31/2007 | ⊞ Wine Type > White | 🗋 Wine Type > White > Chardonnay, Designation > Highly Recommended | Zone One | Inactive | ☐ | ☑ *1805* | 3 | 📄 |
| ☒ | | Highly Recommended | 10/31/2007 | ⊞ (No location specified – this rule applies everywhere) | 🗋 Designation > Highly Recommended | Zone Two | Inactive | ☐ | ☐ | 4 | 📄 |
| ☒ | | Best Buys | 10/31/2007 | ⊞ (No location specified – this rule applies everywhere) | 🗋 Designation > Best Buy | Zone Three | Inactive | ☐ | ☐ | 5 | 📄 |

[Save Changes] [Reset Changes]

*FIG.18*

Navigation States

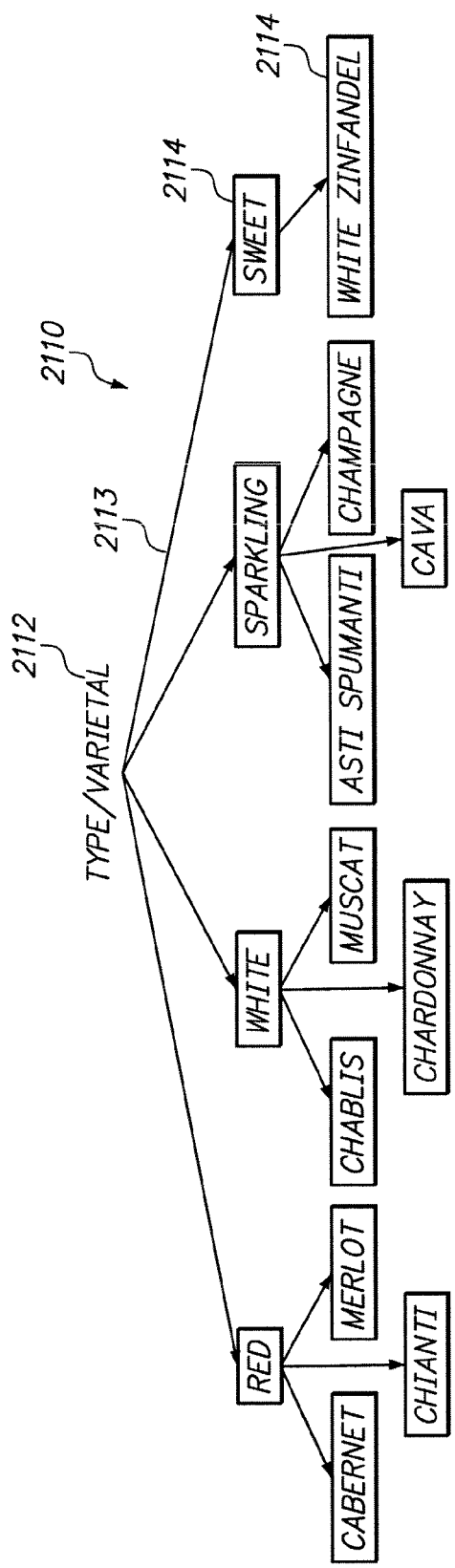
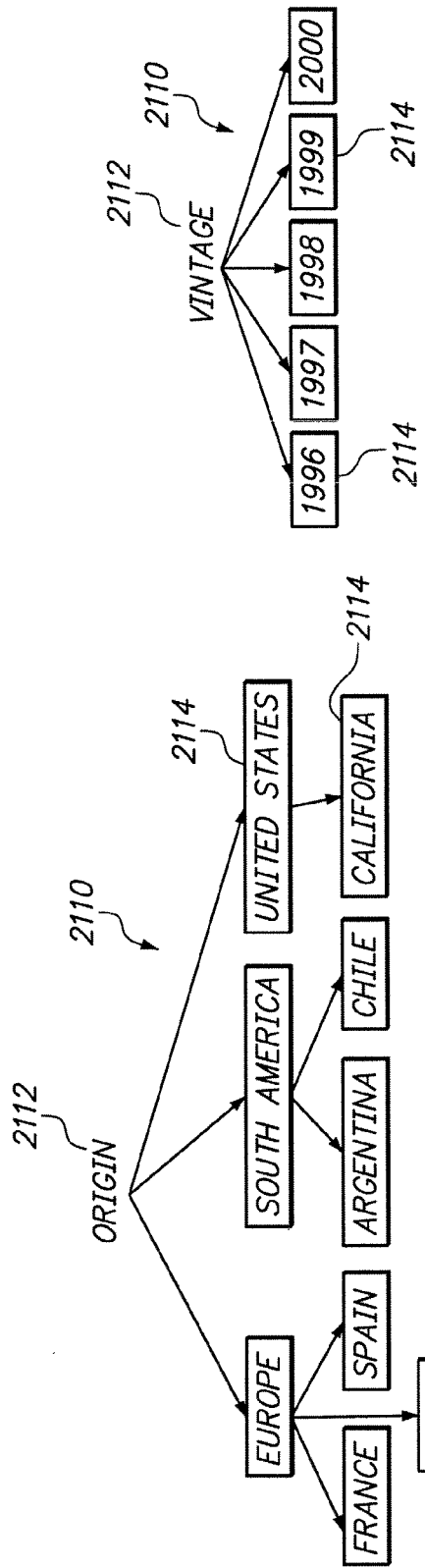
FIG. 21A
FIG. 21B
FIG. 21C

SYSTEM AND METHOD FOR FILTERING RULES FOR MANIPULATING SEARCH RESULTS IN A HIERARCHICAL SEARCH AND NAVIGATION SYSTEM

BACKGROUND

1. Field of the Invention

The invention relates generally to methods and systems for information retrieval, and in particular to methods and systems for filtering rules for manipulating search results in a hierarchical search and navigation system.

2. Related Art

Information retrieval from databases of information, as a result of a user-interface query, is an increasingly challenging problem, with aggregating amounts of information stored in databases and high demands to access that information. Conventional information search and navigation systems support the ability to supplement or modify query results according to criteria depending on the query, the user, or other parameters, such as the date. For example, Google adds sponsored links on top of search results, based on query keywords, and Amazon suggests items to users, based on the profile or the recent purchase history of the user.

A method for manipulating the content of search results in a response to a query in a search and navigation system for a set of items using a plurality of rules is described in U.S. Patent Application Publication No. US 2003-0097357 (Ferrari et al.), which is incorporated by reference in its entirety. The method uses rules composed of a trigger and one or more actions. Upon evaluation of a trigger, for example a trigger based on the entry of a particular query, a rule action specifies how the system provides supplemental content or manipulates the content presentation. An interface for modifying one or more rules by an individual performing rules editing is described in U.S. patent application Ser. No. 10/813,871 (Ferrari et al.), filed Mar. 31, 2004, which is incorporated by reference in its entirety.

However, wide-scale deployment of rules-based solutions to search result content modification presents various difficulties. Under certain circumstances, maintaining a large set of rules over time, managed by more than one individual, can result in complicated layers of logic, some dependent on short-term events such as sales promotions, and others representing longer-term content management policies or best practices. An approach is needed that addresses the scalability of rules-based solutions to content modification.

SUMMARY

For ease of presentation, "materials", "items" and "documents" are used interchangeably to refer to the collection (sometimes referred to as a "database" or "knowledge base") being searched. As used herein, "properties" are related to and may be derived from but are generally distinct from objects identified by the foregoing terms. "Properties" are information-bearing descriptors, which can include terms extracted from a document; however, in preferred embodiments, a set of properties associated with a document does not encompass the full-text of the document. Although the properties are typically associated with the materials beforehand, the properties can also be associated at the time the query is being executed, especially when the materials are text documents. Embodiments of the invention are applicable to environments incorporating free-text searching or selection-based navigation or any other technique for specifying a query. Accordingly, "searching" and "navigation" are at times used interchangeably. The invention has broad applicability and is not limited to certain types of materials or properties.

In one aspect, the present invention provides a computer-implemented method for modifying the results of a search performed in a collection of items by a search and navigation system. The method includes receiving a query from a user interface and determining a navigation state based on the received query. The navigation state is one of a plurality of navigation states which are defined by expressions of attribute-value pairs, such that for a first navigation state and a second navigation state, there are multiple paths of intermediate navigation states connecting the first navigation state and the second navigation state. One method of navigation through the intermediate navigation states is achieved by a user interface that accepts both selecting and deselecting of any of the attribute-value pairs in an expression corresponding to the first navigation state to obtain an expression corresponding to the second navigation state or one of the intermediate navigation states, and each selection and deselection forms a new query. The method further includes retrieving, from the collection, items associated with the navigation state to form a set of unmodified search results. The set of unmodified search results has an arrangement for presentation to the user. The method further includes applying a rule filter, that includes a metadata expression, to a set of rules. Each rule has a trigger, an action, and metadata. The application of the rule filter to the set of rules includes evaluating the metadata expression of the rule filter based on the metadata of each rule and passing rules for which the metadata expression of the rule filter evaluates as logical true. The method further includes evaluating the trigger of each rule passed by the rule filter, and executing the action of each rule for which the trigger of the rule evaluates as logical true to modify the unmodified search results to form modified search results. The modified search results are presented via the user interface.

Embodiments of the present invention may include one or more of the following features. The rule filter may be received from the user interface as part of the query and applied only during a search based on the query. The rule filter may be retrieved from a file and applied for all received queries.

The rule filter metadata expression may include a metadata property equated to a randomly assigned value that specifies a rule test set, and the metadata of at least one of the rules may include a value specifying a rule test set to which the rule belongs. The query may be formed based at least in part on a text input. The query may be received from a user interface that accepts text input, in addition to accepting both selection and deselection of attribute-value pairs in an expression defining a current navigation state, and each text input may form a new query.

The modified search results and the unmodified search results may differ in arrangement. The action of at least one of the rules may include an instruction for sorting the unmodified search results. The modified search results and the unmodified search results may differ by at least one retrieved item. The action of at least one of the rules may include an instruction for aggregating additional search results with the unmodified search results. The additional search results may arise from an additional navigation state specified by the rule action. The additional search results may arise from an additional query specified by the rule action. The action of at least one of the rules may include an instruction for adding at least one of text and graphics to the unmodified search results for presentation to the user.

The rule filter metadata expression may include a metadata property equated to a value specifying a rule state, and the metadata of at least one of the rules may include a value specifying a state of the rule. The rule filter metadata expression may include a Boolean expression comprising a first metadata property equated to a value specifying a state of the rule and a second metadata property equated to a value specifying an author of the rule. The metadata of at least one of the rules may include a value specifying a state of the rule and a value specifying an author of the rule. The rule filter metadata expression may include a metadata property equated to a value specifying a merchandising campaign, and the metadata of at least one of the rules may include a value specifying a merchandising campaign for which the rule was created. The rule filter metadata expression may include a metadata property equated to a value specifying a geographic region. The metadata of at least one of the rules may include a value specifying a geographic region for which the rule was created.

BRIEF DESCRIPTION OF THE DRAWINGS

The present invention will be more readily understood from a detailed description of the preferred embodiments taken in conjunction with the following figures.

FIGS. 2A, 2B, and 2C present an example of a rule filter, an example of a rule that supplements a query response with additional results, and an example of a rule that sorts results presented to the user according to price.

FIGS. 5A and 5B present an example of rule filter and a rule in the "Draft" state for testing purposes.

FIGS. 6A and 6B present an example of a rule filter and a rule used for merchandising campaign management purposes.

FIGS. 9A, 9B, 9C, and 9D present an example of rule filters and rules used for "A/B testing" purposes.

FIG. 10 presents examples of rule filters.

FIG. 11 presents a screenshot of a user management interface.

FIGS. 12A and 12B present screenshots of user interfaces for rule management.

FIG. 13 presents a screenshot of a rule creation user interface.

FIG. 14 presents a screenshot of a rule priority management user interface.

FIG. 16 presents a screenshot of a user interface for rule management.

FIG. 17 presents a screenshot of the results of a query when all rules are inactive.

FIG. 18 presents a screenshot of a user interface for rule management that displays one.

FIGS. 21A, 21B, and 21C present representative examples of partially ordering the range of values for an attribute.

DETAILED DESCRIPTION OF THE INVENTION

Figure 1:
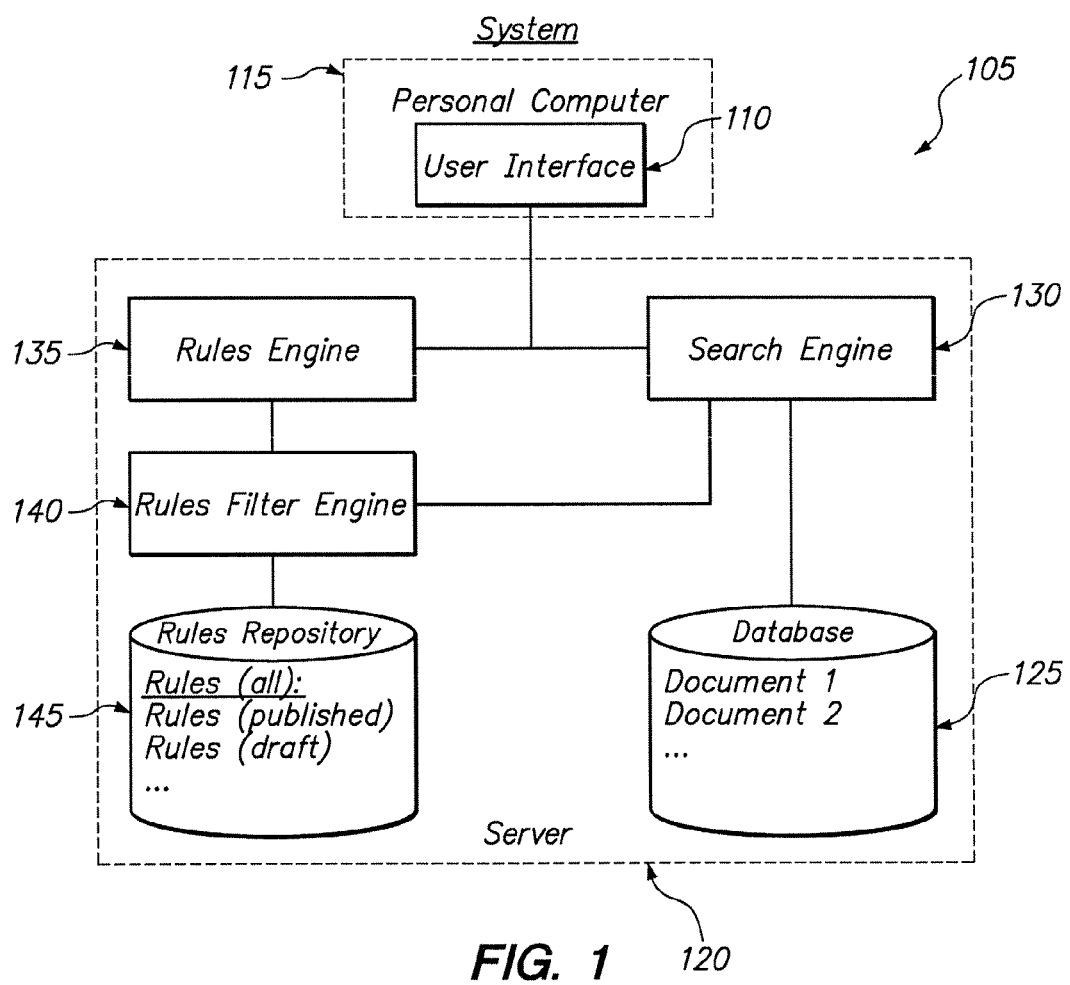
FIG. 1 is a block diagram of a system for filtering rules for manipulating search results in a hierarchical search and navigation system in accordance with the present invention.

FIG. 1 shows a block diagram of a system 105 for filtering rules for manipulating search results in a hierarchical, data-driven search and navigation system. The search and navigation system operates on a collection of documents defined in a knowledge base. A user is presented with a User Interface 110, via an application that allows search and navigation through the collection of documents. The User Interface may be provided, for example, on a personal computer 115 connected to the search and navigation system via a network. The application may be, for example, a web-based search application.

The search and navigation system, which may be implemented in a network server 120, comprises a Database 125, a Search Engine 130, a Rules Engine 135, a Rules Filter Engine 140, and a Rules Repository 145. These blocks are merely a conceptual representation of the functionality of the system and do not necessarily correspond to separate hardware or software components. The system receives input from the user, which can be a free-text query or the selection of a navigation link, or a combination of these functions, and presents the results to the user through the User Interface 110.

Upon receipt of a new user query, the Search Engine 130 determines the corresponding navigation states, which, as discussed in further detail below, are defined by a set of attribute-value pairs that specify a set of properties and comprise the set of documents in the collection that share all the specified properties. For example, in a database of wines for retail distribution, the attribute-value pair {Type/Varietal: Red} has the value "Red", which characterizes the attribute "Type/Varietal", and the attribute-value pair {Origin:France} has the value "France", which characterizes the attribute "Origin". The conjunction of these two attribute-value pairs, {Type/Varietal:Red} AND {Origin:France}, defines a navigation state that comprises all documents that have both of these properties (i.e., each document in the navigation state has both properties). In other words, the navigation state comprises all French red wines in the database.

The Rules Engine 135 receives a set of rules (for performing functions such as modifying the content of the search results) from the Rules Filter Engine 140 and determines whether each of the rules will be executed. Each rule comprises a name (or rule ID), a trigger, a set of actions to be performed upon successful evaluation of the trigger, and metadata. The trigger identifies conditions that, if satisfied, cause the rule to be executed for the current query. For example, the trigger may specify a particular navigation state to which the rule is applicable. The action of a rule specifies how the system provides supplemental content, annotates content, or otherwise manipulates the search result content presentation when the rule is activated. For example, a rule may cause the search results from a retailer's database to include additional items, such as promotional items, when the query includes a particular keyword.

The metadata of the rules is used for, among other things, the filtering of the rules in the Rules Repository 145 to select a subset of the rules which will be evaluated for the current query. As a result of rule filtering, which will be described in further detail below, only a portion of the rules are presented to the Rules Engine 135 for evaluation of their trigger conditions. For example, the system may be configured such that only rules containing the metadata "state=published" are submitted to the Rules Engine 135 for possible execution.

The Rules Filter Engine 140 receives the user-entered free-text query, selected navigation link or links, or a combination of these, as well as information from the Search Engine 130 about the specific navigation states that correspond to the query. The Rules Filter Engine 140 may also receive additional information from the User Interface 110, such as user profile information and date and time information. The Rules Filter Engine 140 may use these parameters to apply pre-defined rule filters to the rules stored in the Rules Repository 145. For example, based on the identity of the user, the Rules Filter Engine 140, in a test configuration, may output all of the "published" rules, but only the "draft" rules that were created by that particular user. The Rules Filter Engine 140 sends the filtered rules to the Rules Engine 135 for evaluation.

The Rules Filter Engine 140 may include a set of default global rule filters that perform basic filtering. For example, as discussed above, a typical default rule filter presents all "published" rules to the Rules Engine 135 to have their triggers evaluated. In addition to the default rule filters, a user with the proper permission can create a specialized global rule filters for particular circumstances, either by using a text editor to create a script that describes the filter, or by using a user interface. For example, an administrator may create a rule filter that allows a creator of a new rule to examine the results of all of the "draft" rules on a live application/database, without affecting the view of the live application for other users. The Rules Filter Engine 140 also may perform filtering based on a rule filter sent by the application as part of the query, i.e., a rule filter to be implemented specifically for that query.

FIG. 2A presents an example of a rule filter 201 that sends all rules with a state equal to "published" to the Rules Engine 135 for evaluation. In this example, the rule filter is expressed as: <metadata identifier>:<value>, which evaluates to logical true when the rule contains metadata matching metadata identifier and the value of that metadata equals value. Rule filters in this format may be stored in the system configuration on the server as global rule filters, which apply to all queries.

Applying this rule filter to the rule 205 shown in FIG. 2B, the Rules Filter Engine 140 passes this rule to the Rules Engine 135, because the state of the rule, as defined in the rule's metadata 220, is equal to "published". In the Rules Engine 135, the trigger 210 of this rule would be successfully evaluated for every query that contains the keyword "DVD" or "VHS". The results of the query that successfully triggers the rule of FIG. 2B would be supplemented with the new movie releases, displayed in a separate frame, as the rule action 215 specifies.

Similarly, in the example of the rule 225 shown in FIG. 2C, the Rules Filter Engine 140 presents this rule to the Rules Engine 135, because the status of the rule is "published", as defined in the rule's metadata 240. The rule is triggered when the query contains the keyword "cheap" 230. In that case, the rule's action 235 manipulates the presentation of the results by sorting the retrieved records according to their prices.

Figure 3:
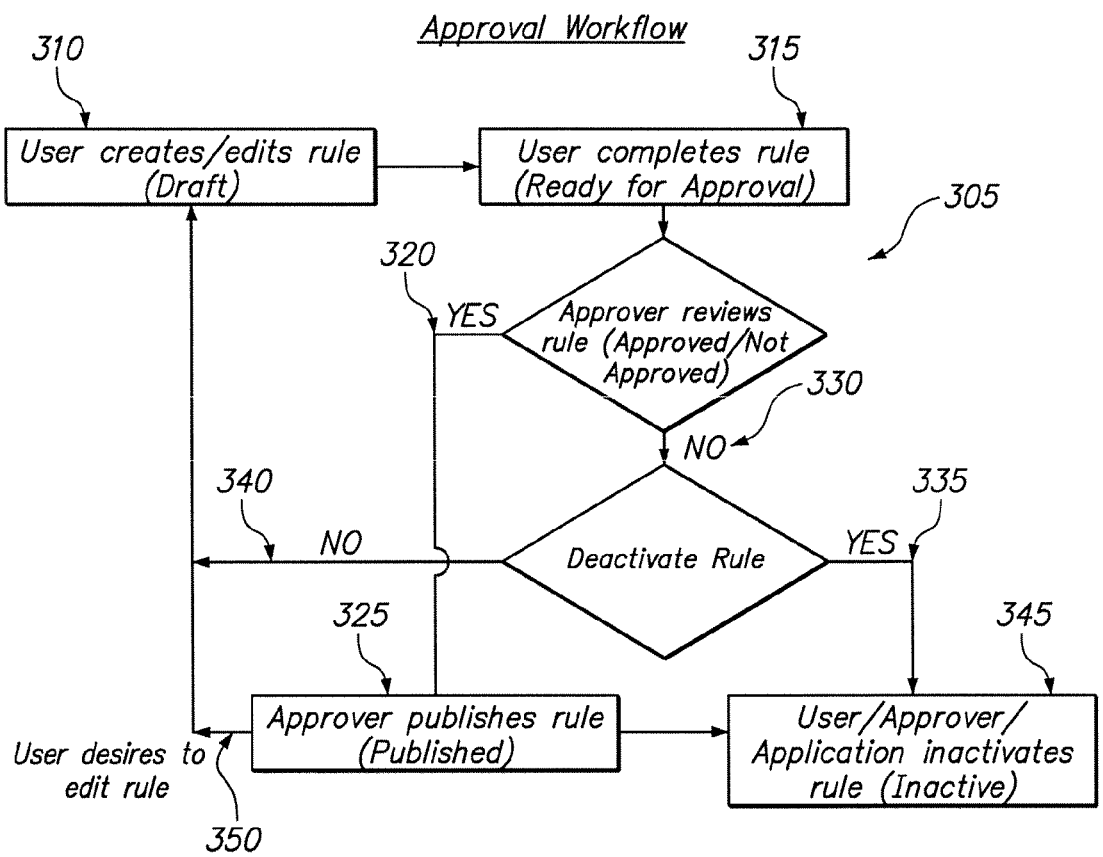
FIG. 3 is a flow diagram of a rule approval workflow process.

FIG. 3 shows a process 305 for adding new rules or modifying existing rules. A user, for example, a business or product manager, can create a new rule 310. When a new rule is created, it is in a "draft" state, and the user can test and modify the rule. The state of the rule is appended to the rule as metadata (state=draft). Along the steps of the approval workflow process, the state of the rule, and hence the metadata tagged to the rule, changes accordingly. The process for adding new rules or modifying existing rules and the corresponding rule states can be modified by a system administrator to meet the needs of a particular set of users. For example, the discussion below contemplates a set of rule states including "published", "draft", "ready for approval", and "inactive". However, the system may be configured to use only two rule states: "active" and "inactive". Various other configurations also are possible.

In the example of FIG. 3, a rule is maintained in a "draft" state until the user has completed modifying and testing the rule. When the user completes testing and modifying the rule, the rule state is changed to the "ready for approval" state 315 and is presented for review to a user ("Approver") with permission to approve rules. The Approver can be notified of rules ready for approval automatically, or the user can manually notify the Approver, for example, by sending an email. If the rule is approved by the Approver 320 the rule state changes to "approved." Then, the rule is published by a user with privileges to publish rules and its state is changed to "published" 325. If the rule is not approved 330, the Approver can either deactivate the rule 335 or return the rule to the user for editing 340. In the first case, the state of the rule is changed to "inactive" 345. In the second case, the creator of the rule is notified and the rule re-enters the "draft" state 310. The creator can, after modifying the rule, change the rule state to "ready for approval" and present the modified rule to the Approver 315. The Approver reviews the rule and decides whether to approve it or not. This can be an iterative process and the rule can be reviewed and modified multiple times before approval or deactivation, i.e., changing the status to "inactive". For example, the approval workflow may be set up so that a new rule is reviewed twice by the Approver before it is deactivated.

A published rule can be edited by a user 350. While the user modifies the rule he has a personal view of a copy of the rule, and the live application is not affected. When the modified rule is ready for approval, the user changes the rule state to "ready for approval" 315 and notifies the Approver. If the modified rule is approved 320, its state is changed to "approved." Then a user with publishing privileges may change the state of the rule 325 to "published", and the modified rule replaces the previous version. According to one embodiment of the present invention, a copy of a published rule may contain information on its parent rule. When the information on the parent rule is presented to the publisher of a modified rule, she can manually delete the previous version of the rule with the new one, or the previous version may be automatically deleted when the new rule is published.

According to one embodiment of the present invention, more than one users can modify a published rule. Each user edits their own copy of the rule and can modify and test the rule before the rule is presented for approval. An Approver can approve one or more modifications of the published rule. A rule publisher can choose which one of the approved rules will replace the previous version of the rule.

Published rules can be deactivated by the creator of the rule, the Approver, or the application 345, for example, when the period of time for the rule has expired. A business manager can create a rule, for example, to promote a Labor Day Sale at an online store. During the Labor Day weekend, all queries performed by users at the company website will result, for example, in a pop-up window that lists the items on sale over the Labor Day weekend. After the weekend, a user with the proper permission may inactivate the rule to prevent the window with the items on sale from popping up. According to one embodiment of the present invention, rules can be deleted from the Rules Repository, in any state, by a user with permission to delete rules.

Figure 4:
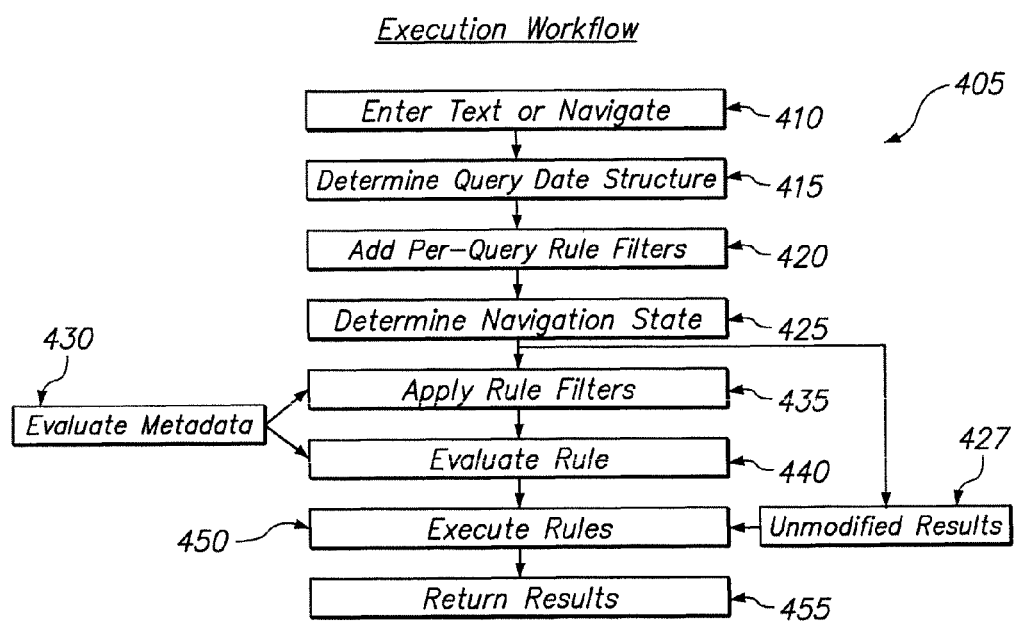
FIG. 4 is a flow diagram of a process for evaluating a rule that manipulates the results of a query.

FIG. 4 shows a flow diagram 405 for executing a rule that supplements or modifies the content of the search results from a user query. The user constructs a query, for example, by either entering text or by clicking on navigation links 410 from a set of available options presented by the application, or a combination of these functions, resulting in an initial query data structure 415. The application may generate a rule filter to be used with the specific query, which may be referred to as a per-query rule filter. The per-query rule filter may be combined with the initial query data structure 420 to form a final query data structure. In addition, session properties, such as the date and time of the session, user profile information, etc., may be included in the query data structure. The query is then passed to the search and navigation system, e.g., by passing it through an Application Programming Interface (API), and the navigation state is determined 425. A set of "unmodified" search results is determined 427 based on the navigation state.

The Rules Filter Engine 140 applies 435 rule filters, both the per-query rule filters sent in the query and any global rule filters that have been stored in the system configuration, to the rules in the Rules Repository based on the rule metadata 430 and sends the filtered rules to the Rules Engine 135 to be evaluated. The triggers of the filtered rules are evaluated 440. Depending on the validity of the triggers, the rules are executed 450, the corresponding actions are performed on the unmodified results, and the results of those actions are returned to the user 455.

As discussed above, rules include a trigger, an action, and metadata. The following are examples of Boolean-valued functions that may be used to specify a trigger:

Query.Equals(Q:Query) returns true if the query being considered by the rule is equal to Q, false otherwise.

Navigation_State.Equals(N:Navigation_State) returns true if the navigation state being considered by the rule is equal to N, false otherwise.

Query.Contains_Attribute_Value Pair(A:Attribute, V:Value) returns true if the query contains the attribute-value pair (A, V), false other wise.

Navigation_State.Contains_Attribute_Value_Pair(A:Attribute, V:Value) returns true if the navigation state contains the attribute-value pair (A, V), false otherwise.

Query.Contains_Keyword (K:Keyword) returns true if the query contains the keyword (K), false otherwise.

Navigation_State.Is_Ancestor_Of(N:Navigation_State) returns true if the navigation state being considered by the rule is an ancestor of N, false otherwise.

Navigation_State.Is_Descendant Of(N:Navigation_State) returns true if the navigation state being considered by the rule is a descendant of N, false otherwise.

Navigation_State.Contains_Document(D:Document) returns true if the navigation state being considered by the rule contains document D, false otherwise.

A trigger may include a time element that specifies a time period during which the rule is active. The following are examples of the language for specifying a time trigger element:

Current_Date_Time.Greater_Than(D:Date_Time) returns true if the date and time of the query is after the date and time specified in "Date_Time."

Current_Date_Time.Less_Than(D:Date_Time) returns true if the date and time of the query is before the date and time specified in "Date_Time."

Current_Date.Greater_Than(D:Date) returns true if the date of the query is after the date specified in "Date."

Current_Date.Less_Than(D:Date) returns true if the date of the query is before the date specified in "Date."

The language for specifying a trigger may include the Boolean operators AND, OR, and NOT. Also, the language for specifying a trigger may allow for variables local to the rule to be populated based on the navigation state being considered by the rule. Such variables might correspond to terms in the navigation state, and could be specified positionally (e.g., the second term in the navigation state) or in terms of the partial order of terms (e.g., the term or terms in the navigation state that are descendants of a given term). These variables, once populated, can be used by the rule's action.

The language for specifying an action to modify the content of the search results may include the following operations or a combination thereof:

Include_Document(D:Document), where document D either is hard-coded or is partially or fully determined based on variables populated by the trigger.

Include_Query(Q:Query), where query Q either is hard-coded or is partially or fully determined based on variables populated by the trigger. This operation may provide a preview of the navigation state corresponding to query Q. Such a preview could include a document or a plurality of documents, or some other information that summarizes or otherwise describes the navigation state.

Include_Navigation_State(N:Navigation_State), where navigation state N either is hard-coded or is partially or fully determined based on variables populated by the trigger. This operation may provide a preview of the included navigation state. Such a preview could include a document or a plurality of documents, or some other information that summarizes or otherwise describes the navigation state.

Include_Text(T:Text), where text T either is hard-coded or is partially or fully determined based on variables populated by the trigger.

Include_Graphics (G:Graphics), where graphics G either is hard-coded or is partially or fully determined based on variables populated by the trigger.

The language for specifying an action may include operations for filtering, sorting, aggregation, and truncation. These operations can be applied to documents or navigation states. These operations can be applied to query results, to content pushed by rules, or to both. These operations may act in a way that either is hard-coded or is partially or fully determined based on variables populated by the trigger. Also, these operations may make use of randomization.

Other types of rule action also are possible. For example, document filtering may be used to reduce the number of documents in the query results or the content pushed by rules by restricting the documents in either or both sets to those satisfying a predicate, e.g., the documents containing a particular term specified by the rule. A document filter can be composed using Boolean operations. Navigation state filtering is analogous, except that it is applied to the set of navigation states to be included in the results or pushed content, rather than to the documents.

Document sorting may be used to reorder the documents in the results, e.g., ordering them by date or popularity. A document sort key can be based on explicitly represented document information or can be derived from such information. Navigation state sorting is analogous, except that it is applied to the set of navigation states included in the results or pushed content, rather than to the documents.

Document aggregation may be used to group the documents in the results into equivalence classes based on an explicit or derived property of those documents. The aggregation key can be specified using an attribute or plurality of attributes. Also, the aggregation key can be based on explicitly represented document information or can be derived from such information.

Document truncation may be used to reduce the number of documents in the results by restricting them to a particular number of documents. Truncation respects document ordering, i.e., truncating to 10 documents eliminates all but the first 10 documents from the results. Navigation state truncation is analogous, except that it is applied to the set of navigation states included in the results, rather than to the documents.

These operations may act in a way that either is hard-coded or is partially or fully determined based on variables populated by the trigger. For example, a rule may filter included documents to include only those that contain a majority of the terms in the navigation state. Alternatively, a rule may sort included documents by the first term in the navigation state. In yet another example, a rule may include a number of navigation states that is truncated based on the number of terms in the navigation state. These operations may make use of randomization. For example, a rule may determine a set of candidate documents or navigation states to include, and then use a random or pseudorandom process to determine which of those candidates to actually include.

A single rule may use one or more of these operations. It may order and apply them in any combination, possibly using the same operation more than once. For example, a set of included documents may be (1) filtered, then (2) sorted according to a given sort key, then (3) aggregated according to a given aggregation key, and then (4) truncated to 10 aggregates. A rule or plurality of rules may be specified in a script. In such a case, the rules may be combined using sequential, conditional, or randomized execution.

In sequential execution, rules are considered in the order they are specified. For example if two rules triggered by the same query or navigation state are executed sequentially, then the first rule is considered before the second. Sequential execution may take prioritization into account. For example, higher priority rules may be considered before lower priority rules, and the priority may be reflected in the order of results.

In conditional execution, the execution of a rule depends on specified criteria. In some embodiments of the present invention, conditional execution can be specified using "if . . . then . . . else" logic. Conditional execution may be combined with sequential execution, such that the results of considering an earlier rule partially or completely determine whether a later rule is executed. For example, a conditional rule may be specified to execute only if less than three previous rules have been executed for a given query or navigation state.

In randomized execution, the execution of a rule depends on a random or pseudorandom process. For example, a rule may be specified to execute only half the time that it is considered, in order to vary the results randomly. Randomized execution may be useful in combination with conditional execution. For example, it may be used to execute a randomly-selected subset of 3 out of 10 applicable rules.

The Rules Engine 135 may execute the rules in order, which may be established by assigning a number to an order field of each rule, e.g., 1, 2, 3 . . . . Several rules may be assigned the same order value in order to indicate that those rules can be performed in arbitrary order, thus making the ordering of rules a partial rather than total order.

The execution of a rule may depend on two factors. The first factor is the trigger. The second factor is any conditional criterion specified for the rule, such as an expression than depends on the results of the execution of a previous rule. In such a case, the rule is executed only if both of these factors evaluate to true. For example, a group of rules may be identified by numbers 1 through 10. The evaluation of rules in this group may be subject to the condition that a maximum of two of these rules are to be executed, after which time the remaining rules in the group are no longer considered for execution.

FIGS. 5A and 5B present an example 505 showing a rule filter 507 and a rule 508 used for rule testing. As discussed above, a rule filter may be provided as a default, or a user with the proper privileges can create a specialized rule filter for particular circumstances. In addition, the search application running as part of the User Interface may generate a per-query rule filter, as shown in FIG. 5A, which is passed with the query to the search and navigation system. In general, a query may comprise a uniform resource locator (URL), followed by a series of entities (i.e., parameters). For example: http://www2.lib.ncsu.edu/catalog/?Ntt=patent&N=4294967217+206437. In this query, the entity Ntt is a free-text query term entered by the user (the word "patent"), and the entity N is a combination of navigation states that have been selected by the user, which are identified by numbers. Components of the query, including the rule filter, may be obscured, combined, or encoded before being displayed by the User Interface in order to simplify the URL visible to the user (e.g., in the URL address line of a web browser) and to prevent direct modification of query components by the user. However, in such case, the search and navigation system will include a complementary mechanism to decode or otherwise interpret the URL, and otherwise, the operation of the system will be as described above.

The query of FIG. 5A comprises a URL (not shown) with an appended portion as shown, in which <application> is the search application running on the User Interface. Following "?" are the entities to be passed with the query. The entity N=0 indicates a navigation state that corresponds to the entire database, and it is being used here for purposes of discussion merely as a placeholder in lieu of an actual navigation state selected by the user. The entity Nmrf= . . . is the per-query rule filter. The rule filter is specified in this example as a Boolean expression, although other types of expressions also are possible. The expression contains metadata references in the form: <metadata identifier>:<value>, which evaluates to logical true when the rule contains metadata matching metadata identifier and the value of that metadata equals value. For example, expression "state:draft" evaluates as true for rules that contain metadata "state=draft". Thus, the rule filter of FIG. 5A will pass rules having metadata "state=published" or "state=draft" and "author-watkins". In other words, the rule filter passes all published rules, but only the draft rules authored by Watkins.

Each rule filter specifies a subset of rules to be executed, and consequently, a subset not to be executed, based on the metadata associated with the rules and possibly additional information unique to each query, such as user profile information. The metadata is a generic mechanism and any arbitrary data may be specified in the metadata. For example, the rule metadata may specify:

- the state of the rule, e.g., draft, ready for approval, approved, not approved, published, inactive;
- the author of the rule;
- the date the rule was created;
- the date the rule was reviewed;
- the reviewer of the rule;
- the approver of the rule;
- the date the rule changed state;
- the date the rule was edited;
- the date(s) the rule is effective;
- the group to which the rule belongs
- the A/B set to which the rule belongs;
- the promotional campaign for which the rule was created; and
- the geographic region for which the rule was created.

The rule shown in the example of FIG. 5B was created by user "Watkins", who wishes to supplement the results of user queries that produce navigation states containing the attribute-value pair {Type/Varietal: Pinot Noir} with a list of white wines of {Type/Varietal: Pinot Grigio}. The rule includes metadata 520 that specifies that the rule state is "draft" and that the rule author is "Watkins". When "Watkins" logs in the system to perform a query for "Pinot Noir" wines, the rule filter 507 is applied, and the Rules Filter Engine 140 checks for the state and author attributes in the metadata 520. In this example, the rule is in the "draft" state, and the author of the rule has performed the query. These two values allow the rule 508 to be passed by the Rules Filter Engine 140 to the Rules Engine to be executed. The Rules Engine evaluates the trigger 510 as TRUE, and the action 515 specifies that the list of Pinot Noir wines should be supplemented with a separate frame of Pinot Grigio wines with a heading: "What about white wine?" Because the state of the rule is "draft", this rule is not active to other users who perform queries for "Pinot Noir" wines.

FIGS. 6A and 6B present an example 605 showing a per-query rule filter 610 and a rule 615 that returns TV sets on sale, as part of a Labor Day weekend promotion. The user performs, for example, a search for "Plasma TVs", on a Labor Day weekend. The rule filter 610 in FIG. 6A is added to the query by the search application as a per-query rule filter. The rule filter specifies values for region and promotion to be matched in the rule metadata. This example assumes that there is also a global rule filter in place to filter rules in which "state=published". The Rules Filter Engine presents the rule shown in FIG. 6B to the Rules Engine, because it is published, when the query is performed on a Labor Day weekend, and the query is performed from a specific region, in this case "North America" 630. Because different countries celebrate Labor Day on different dates, the Rules Filter Engine can use the metadata 630 to specify the region to selectively present the appropriate rule for evaluation. In the Rules Engine, the rule "Labor Day TV Sale" is successfully triggered 620 by the query keyword "TVs". The results that correspond to the user query are supplemented with the TV sets that are on sale during the Labor Day weekend, as specified by the rule action 625.

Figure 7A:
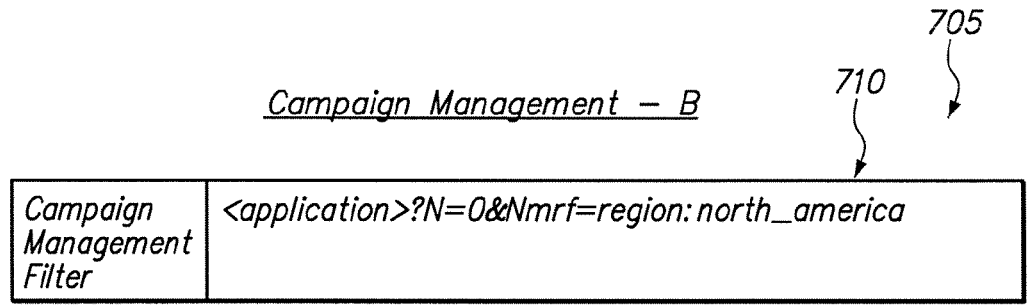
FIGS. 7A, 7B, and 7C present an alternate example of a rule filter and two rules used for merchandising campaign management purposes.
Figure 7B:
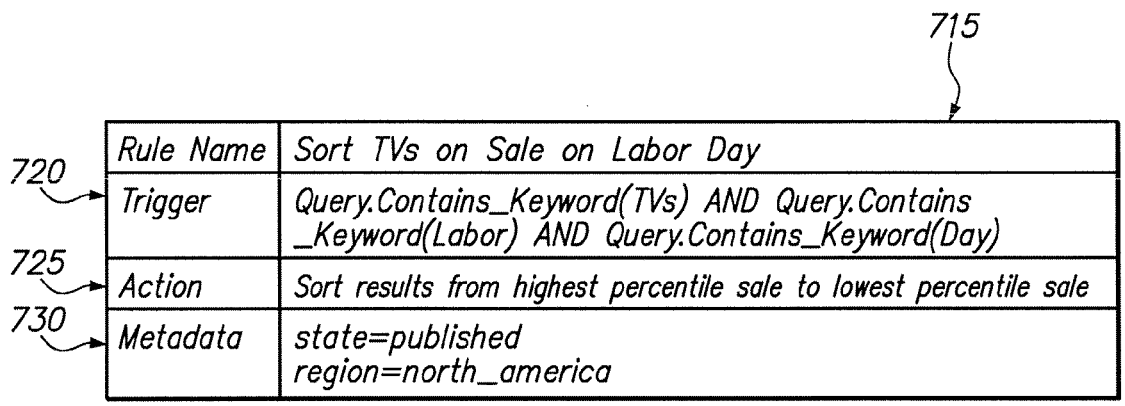
Figure 7C:
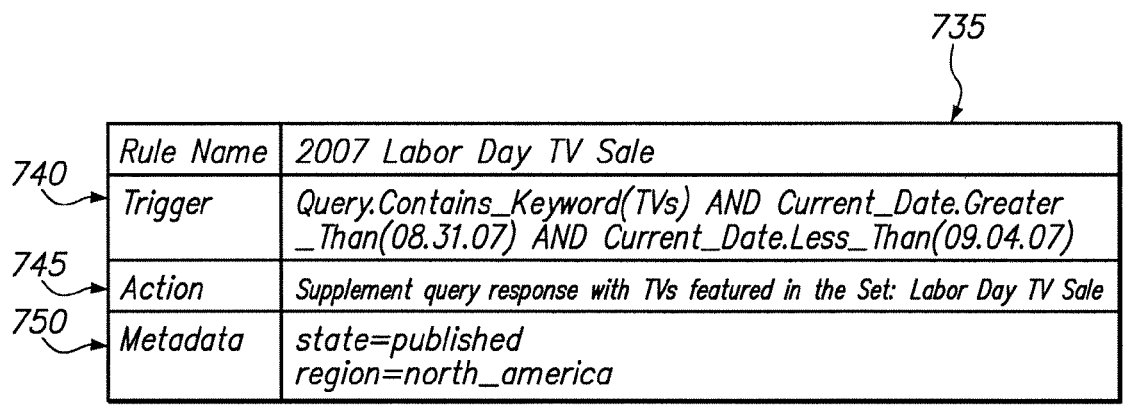

An alternate example of a rule filter that selects rules for campaign management along with two rule examples 715, 735 are shown in FIGS. 7A-C. In this example, the rule filter 710 specifies values for region, but not the specific promotion. A user may perform a query for TVs on sale on a Labor Day weekend, for example, "TVs Labor Day Sale." The rule filter 710 is applied and the Rules Filter Engine presents the published rule 715 to the Rules Engine (assuming a global rule filter is in place to pass only published rules), when the query is performed from a specific region, in this case "North America." The rule trigger 720 evaluates to true and the rule action 725 modifies the results of the search according to a promotional campaign, specified by the rule creator, because the query contains "labor" and "day" and "TVs".

A different rule used for similar campaign management purposes can be implemented as shown in FIG. 7C. As an example, the user query can be "Flat Screen TVs." The same rule filter 710 shown in FIG. 7A is applied, and the Rules Filter Engine examines the rule metadata 750, namely the region in which the query was performed, and presents the rule to the Rules Engine for evaluation. If the query is performed within the date range specified by the dates in the trigger, the trigger evaluates to true, and the rule action supplements the results with the featured TVs in the Labor Day TV sale set.

Figures 8A, 8B:
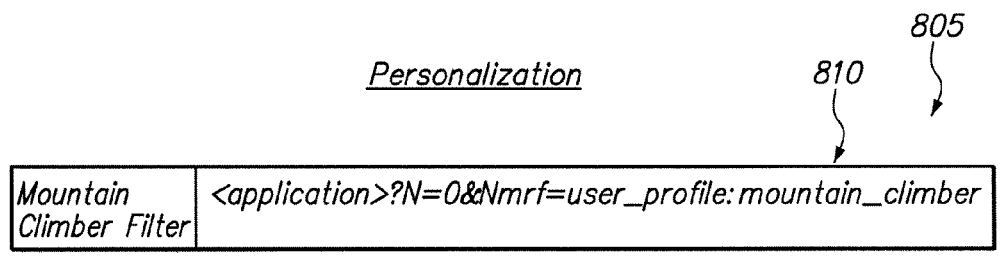
FIGS. 8A and 8B present an example of a rule filter and a rule used for profile personalization purposes.

As shown in FIGS. 8A and 8B, a rule can be "personalized" by including metadata corresponding to user profile information on the intended target user. For example, in a website that sells sporting goods there might be rule categories which identify users based on the products in which they have previously shown interest. FIG. 8A presents a rule filter 810 and FIG. 8B presents a "Mountain Climber" rule 815, with metadata 830 corresponding to a "mountain_climber" user profile. A user who had previously purchased or viewed climbing items may be profiled as "mountain_climber", and each time a "mountain_climber" performs a query, the rule filter 810 is applied and the Rules Filter Engine presents the rule shown in FIG. 8B to the Rules Engine. The action 825 specified by the rule supplements the results of the query with climbing items in this example.

FIGS. 9A-D show an example 905 that uses two rules 920, 940 and two corresponding rule filters 910, 915 to perform "A/B testing" in a wine database. A User, for example a sales manager, can use "A/B testing" to compare two or more sets of rules to determine which is more effective in actual use in the live application. Rule filtering makes "A/B testing" operationally easier to perform. In the example, a manager is evaluating two ways of promoting a specific French wine. The rule "Test Frame" 920 is tagged with a set value of "A" 935, while the rule "Test Order" 940 is tagged with a set value of "B" 955. For each user session, the search application randomly assigns a value (e.g., "A" or "B") to the user. The value is used to form a per-query rule filter, as shown in FIGS. 9A and 9B, which is configured to pass only rules having metadata "set=A" or "set=B", depending on the value assigned to the user.

In this example, when a user assigned a value of "A" performs a query for "French wines", the rule filter "A/B Testing Filter A" 910 applies, and the Rules Filter Engine presents the "Test Frame" 920 rule to the Rules Engine. The action 930 specified in the rule adds a separate frame above the results with the wine being promoted. When the application assigns a set value "B" to the user, the rule filter "A/B Testing Filter B" 915 applies, and the appropriate rule passed by the Rules Filter Engine is "Test Order" 940. The Rules Engine specifies an action 950 to the Search Engine, and the query "French wines" returns the list of French wines in the database, with the promotional wine being listed first in the search results. By examining the percentage of users who view information and/or purchase the promotional wines, the rule sets can be compared and, in the future, the set which performs better can be used for all users.

In some embodiments of the present invention, the syntax for rule filters supports prefix-oriented Boolean operators (AND, OR, and NOT) and uses comma-separated name/value pairs to specify properties and numeric rule IDs. The wildcard operator (*) is also supported.

An example of syntax requirements for specifying rule filters is provided below:

The following special characters cannot be a part of a property name or value: ( ):,*

Property names are separated from property values with a colon (:). For example:
<application>?N=0&Nmrf=state:approved This filters for rules where state property has a value of approved.

Name/value pairs are separated from other name/value pairs by a comma. For example:
<application>?N=0&Nmrf=or(state:ready_for_approval,state:approved)

This filters for rules where state property is either approved or pending approval.

Rule IDs are specified by their numeric value, character data, or string. For example:
    <application>?N=0&Nmrf=5
This filters for rules whose ID is 5.

Multiple rule IDs, just like multiple name/value pairs, are also separated by a comma. For example:
    <application>?N=0&Nmrf=or(1,5,8, Rule__1)
This filters for rules where the values of the rule ID is either 1,5, or Rule__1.

Boolean operators (AND, OR, and NOT) are available to compose complex combinations of property names, property values, and rule IDs. For example:
    <application>?N=0&Nmrf=and(image_path:/common/images/book.jpg, all_text:*)
This filters for rules where the value of the image_path property is book.jpg and all_text contains any value including null.

Wildcard operators can be substituted for any property value. For example:
    <application>?N=0&Nmrf=and(not(state:*), not(all_text:*))
This filters for rules that contain no value for both the state property and all_text property.

FIG. 10 shows several examples of rule filters 1005. In one example 1010, a user with administrative privileges can see the effect of all active rules, including those in a "draft" state that are being created and edited by other users. In another example 1015, the filter selects from the Rules Repository, in addition to the published rules, the rules being edited by user "Watkins" when "Watkins" logs in the system to perform a query. In another example 1020, an Administrator can see the effect of all the rules in a "draft" state that are specific to a certain region. In another rule filter example 1025, a rule presents all the published rules with IDs associated with July 4$^{th}$ as part of a 4$^{th}$ of July promotional campaign.

The use of Boolean operators and comma-separated name/value pairs, as shown above, are for illustration purposes. In some embodiments, the Rules Filter Engine syntax might use the entire set of operations supported by the full search engine, while other embodiments may support Boolean operations plus some limited set of string and control statement operators. Additionally, the Rules Filter Engine syntax could use data objects and can call functions to the data objects that return logical true or false. A Graphic User Interface may be provided for the creation of rule filters.

As discussed above, Rule filtering is useful for reviewing the effect on the live application of various rules created by different users in the rule testing stage. When a user creates and tests a rule, he has a view of the live application that reflects his newly created rule. He cannot view the effect of rules being tested by other users. However, an administrator or a user with special privileges can create a rule filter that selects from the Rules Repository all the rules in the "draft" state. Viewing the effect of the different rules on the live application, the administrator can, for example, provide feedback to the various users that create rules, or decide to delete some rules.

A screenshot 1105 of an interface that allows a System Administrator to add a user to the system is shown in FIG. 11. The Administrator can specify the username 1110 and assign new password 1115 to the user. Additionally, the interface allows to add identity 1120 to the user, such as email address 1135 and the first 1125 and last name 1130. The Administrator can assign different permissions 1140 to the user, such as the permission to approve, publish, create, edit, or inactivate a rule. The manager can also specify access permissions 1145, such as administration access or configuration access.

In the example of FIG. 12A, the interface 1205 presents different options for rule management. The tabs across the top of the interface 1210 allow a user to Add, Audit, Approve, Do Not Approve, Inactivate, or Delete a rule. As depicted in this exemplary interface, the Audit Rule option 1215 provides information on the Priority, the Zone, the Status, the State, the Name, the Date Created, the Date Reviewed, and the Date various rules were Published. Additionally, when the user is in the Audit Rule option, she can approve or not, inactivate, or delete a rule, by selecting the checkbox 1220 next to the rule and pressing the appropriate tab to perform the action.

FIG. 12B shows an alternative user interface 1225 that performs the same management options as the previous one. The value of the State in this particular interface is a drop-down list 1230 and a user, with permissions to do so, can change the value. The available values that appear on the list are only those that the user has permission to modify. If a user has no permission to change the state at all, then the state is presented as a static read-only value. A user with permission to delete a rule, has the option to delete the rule by pressing the appropriate delete button 1235 next to the rule. In both examples, the user is presented with a tab that allows the creation of a new rule.

FIG. 13 shows a screenshot 1305 of an interface used for creating rules. The interface presents to the user different tabs 1310 (General, Where and What, When, Who, and Advanced) that provide different options 1315. For example in the General tab, the user can specify the name and assign the Zone, the Style, and the state of the rule. Additionally, every time a rule is created or modified, information on the author, the creation date, the reviewer, and the revision date are appended to the rule.

In some embodiments of the present invention the approval workflow environment might allow editing of the priority of a rule. For example, a user may want to edit the priority of a rule that belongs to a specific group. The concept of priority is affected by the state of a rule, because unpublished rules will not appear in the live application. There may be a priority assigned to the group, as well as a priority that relates only to the rules in a specific group that are published. The priority of a rule can be set, for example, by the Approver. Alternatively, the priority of a rule may be handled as part of the information about the rule that must be approved. The user may enter the priority of a rule as it relates to other rules in the group.

FIG. 14 shows a user interface 1405 used for management of the rule priorities. In this example, the relative or published priority 1410 appears as part of the rule information to inform the user of the effective priority of the rule in the live application. Four rules are shown, only one of which is published. The set priority of the published rule is 4 (1415). However, because it is the only rule in the group that is published, the relative priority is 1.

In some embodiments of the present invention the approval workflow environment allows users to add or edit keyword redirects. A user, with proper permission, may create and edit keyword redirect link combinations. The user requests approval, and an authorized approver approves the new or edited keyword redirects. The history of the changes and publication is saved to a log file.

Figure 15:
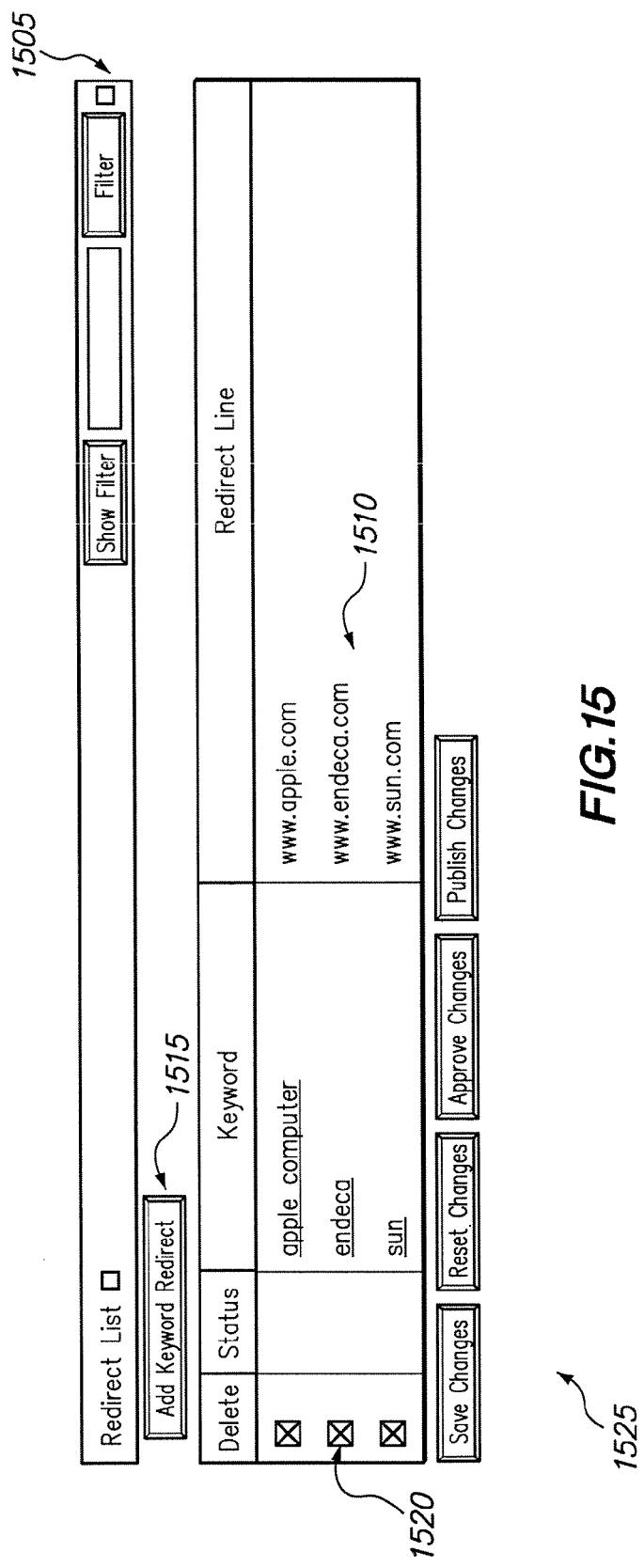
FIG. 15 presents a screenshot of a keyword redirect management user interface.

In FIG. 15 an interface 1505 for managing keyword redirects shows three active redirects 1510. A user with the proper permission can add a new redirect by selecting the appropriate tab 1515 and providing the keyword and the redirect link. The same or another user with proper permission can delete a keyword redirect by clicking on the delete button 1520 next to each redirect. The user interface also provides tabs 1525 for saving, resetting, approving, and publishing changes. Keyword redirects may be thought of as specialized rules, because they are triggered by entry of certain keywords and take the action of presenting a particular webpage to the user. For example, if a user enters "apple computer" as a free-text query, the engine will redirect the results to a link or a navigation state that can correspond to the Apple company website.

In embodiments of the present invention, the approval workflow environment allows users to add or edit thesaurus entries. A user with the proper permission may create and edit thesaurus entries and save them to the configuration. The user requests approval, and an approver may then approve the new or edited entries. The history of the changes and publication is saved to a log file. Thesaurus entries may also be thought of as a special case of rules, because the entry of a particular keyword may trigger an action in which an alternative word (or phrase) is used in a search. For example, if a user enters "disk" as a free-text query, the engine may replace the specific keyword, for example, with "CD" instead of a "plate", and can present results based on the replaced keyword.

In embodiments of the present invention, the approval workflow environment allows users to add or edit phrase entries. A user with the proper permission may create and edit entries and save them to the configuration. The user requests approval, and an approver approves the new or edited phrase entries. The history of the changes and publication is saved to a log file. Phrase entries may also be thought of as a special case of rules, because they are triggered by the entry of certain keywords and take the action of replacing the word (or phrase) with a predefined word (or phrase). For example, if a user enters "compact disk" as a free-text query, the engine may replace the specific keyword, for example, with "CD" and can present results based on the replaced keyword.

In embodiments of the present invention, the approval workflow environment allows users to add or edit stop words. A user with proper permission may create and edit stop words and save them to the configuration. The user requests approval, and an approver approves the new or edited stop words. The history of the changes and publication is saved to a log file. The same functionality may be provided for the creating and editing of dimensions and dimension value orders.

When unexpected spotlighting results or other unexpected actions are occurring in the live application, a manager may log in and review the published rules. For example, the manager can view when the rule was created, approved, and published, and who performed these actions. This information enables the manager to consider whether the rule creator should not have the capability to publish a rule without approval from another party. The manager can edit the user profile to prevent the user from publishing additional rules.

In embodiments of the present invention, the approval workflow environment allows a user, for example, a business or program manager, to create a rule to promote a product for a specific period of time. In such a case, the manager may be given permission in the system to access only one particular rule group and may be given permission to create, but not approve or publish rules. The manager would not be able to create rules for any rule group except the group to which permission has been granted. As with other types of users involved in rule creation, the rules created by the manager are initially in the "draft" state. When the rule is ready for publication, the manager modifies the state of the rule to "ready for approval." The users authorized to approve rules in that rule group are notified of the new rule. An Approver with the proper permission may then approve the rule, at which time the rule state is changed to "approved" and eventually to "published".

The approval workflow environment might allow previewing rules in a specific state. For example, the users may preview "draft" and "ready for approval rules", "approved" rules, or "published" rules. In certain embodiments, the rules may be setup to have a state set of "active", which are rules that are currently in operation in the live application, or "inactive", which are rules that have not yet been approved or that have been deactivated.

FIG. 16 shows a user interface 1605 for previewing and editing the state of a group of rules. This interface may be used, for example, by an administrator who wants to test new and existing rules. In this example, there are five rules 1610 listed on the screen, all of which have their state 1615 set to "inactive". The Filter tab 1620 shown in FIG. 16 allows a user to selectively display a group or set of rules. For example, if there is a set of rules created for Labor Day, the administrator can type "Labor Day" in the field 1625 and have a view of the rules associated with Labor Day. This should not be confused with the rule filtering based on metadata, which, as discussed above, presents a particular subset of the rules to the Rules Engine to be executed.

As shown in FIG. 17, when a user performs a query while all of the rules are in the "inactive" state, none of the rules will be passed to the Rules Engine 135 for execution, so there will be no modification of the content of the search results. FIG. 17 shows the unmodified results 1705 returned in such a case, which correspond to the documents in the wine collections that correspond to the attribute-value pair {Wine Type: White}.

Figure 19:
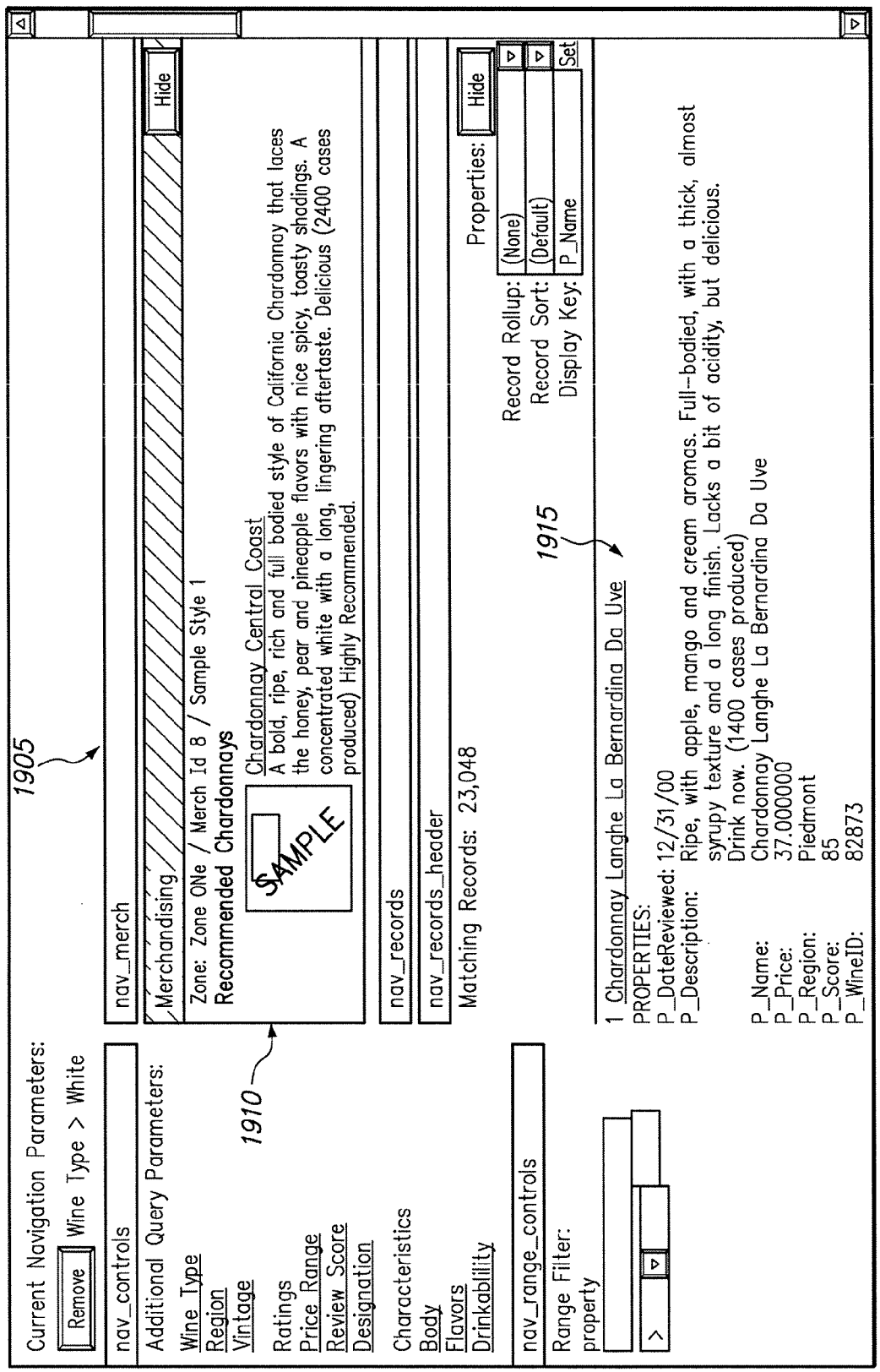
FIG. 19 presents a screenshot of the results of a query when the action of one rule is previewed.

As shown in FIG. 18, users with proper privileges, such as an administrator, can see the effect of inactive rules on the live application by checking the preview box 1805 for one of the rules. This automatically creates a rule filter which selects only rules which either have their state set to "active" or a rule ID that corresponds to the rule that has been selected to be previewed. The modified search results 1905 based on the action of the previewed rule are shown in FIG. 19, in which a specific wine record 1910 is displayed above the result set 1915.

As discussed above, the Rules Filter Engine can have a set of default filters that specify basic rule filtering, a set of rule filters automatically created by the application, e.g., the rule filter created by selecting the preview button, as shown in FIG. 18, and a set of rule filters added by an administrator, e.g., a set of rules entered in text form using the rule filter syntax described above. All sets of rule filters can be automatically loaded or passed with each query, or the application can choose not to consider a set. For example, if an administrator has created a set of rule filters to replace the default set, the application may not apply the default rule filters.

As discussed above, the Rules Filter Engine 140 passes filtered rules to the Rules Engine 135 to be executed to modify the results of a search performed by the Search Engine 130. The Search Engine 130 may employ various search methodologies, but in the preferred embodiment, it features a hierarchical search and navigation system based on a set of navigation states that are each defined by an expression of terms, e.g., attribute-value pairs.

Figure 20A:
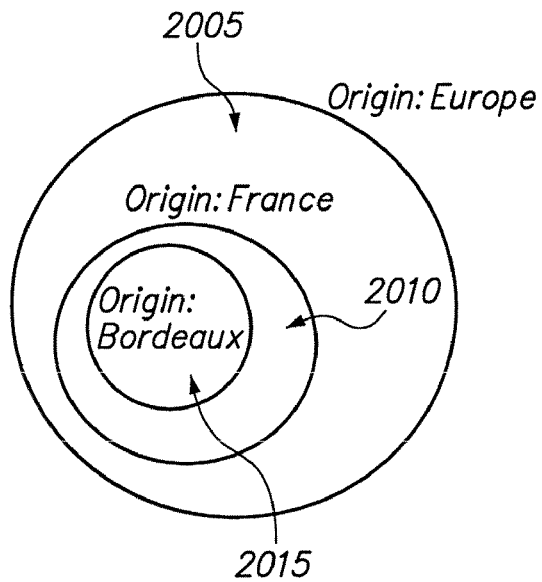
FIGS. 20A and 20B present examples of navigation states from a wine collection database.

In this type of search and navigation system, a partial order of refinement relationships is defined among the terms, which in this example are attribute-value pairs. For example, as shown in FIG. 20A, the term {Origin: France} 2010 refines the term {Origin: Europe} 2005. The refinement relationships in the search and navigation system are transitive and anti-symmetric. Transitivity means that, if term A refines term B and term B refines term C, then term A refines term C. For example, if {Origin: Bordeaux }2015 refines {Origin: France} and {Origin: France} refines {Origin: Europe}, then {Origin: Bordeaux} refines {Origin: Europe}. Anti-symmetry means that, if two terms are distinct, then both terms cannot refine each other. For example, if {Origin: Bordeaux} refines {Origin: France}, then {Origin: France} does not refine {Origin: Bordeaux}.

Figure 20B:
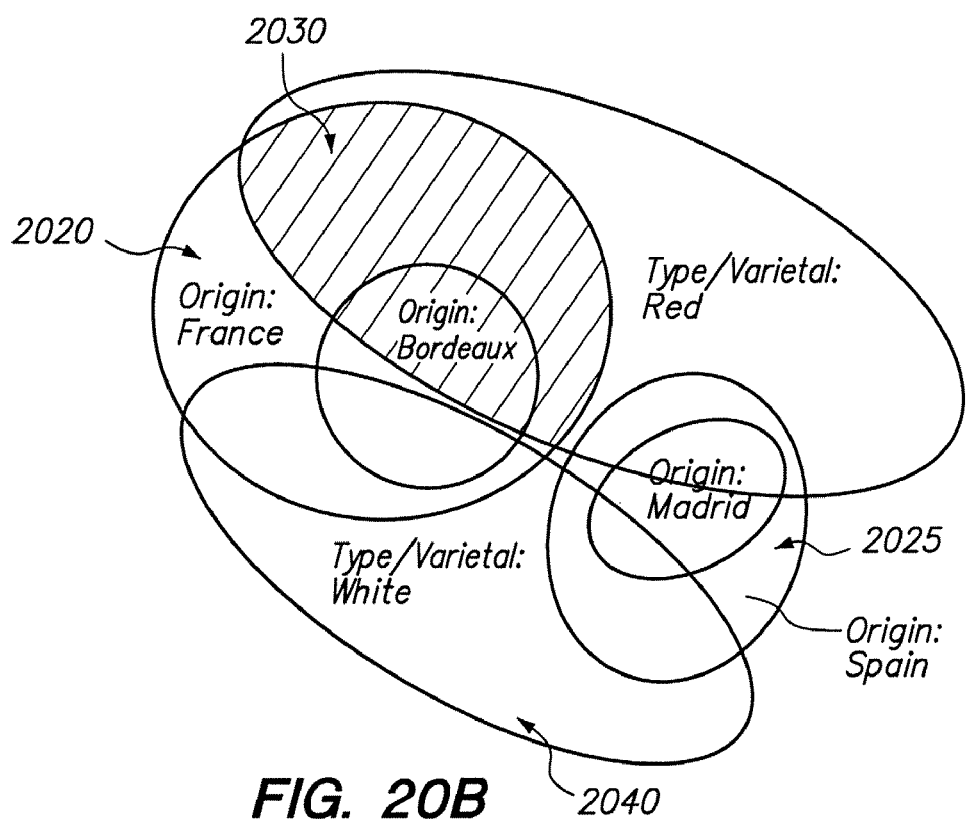

Further, the partial order of refinement relationships among terms is not necessarily a total one. For example, as shown in FIG. 20B, there could be two terms, {Origin: France} 2020 and {Origin: Spain} 2025, such that neither term refines the other. Two terms with this property are said to be incomparable. Generally, a set of two or more terms is mutually incomparable if, for every pair of distinct terms chosen from that set, the two terms are incomparable. Typically, but not necessarily, two terms with distinct attributes will be incomparable.

Given a set of terms, a term is a maximal term in that set if it does not refine any other terms in the set, and it is a minimal term in that set if no other term in the set refines it. For example, in the set {Origin: France, Origin: Bordeaux, Origin: Spain, Origin: Madrid}, {Origin: France} and {Origin: Spain} are maximal, while {Origin: Bordeaux} and {Origin: Madrid} are minimal. A term is a root term if it does not refine any other terms and a term is a leaf term if no other term refines it.

As shown FIG. 20B, using a wine collection example, a navigation state that corresponds to all wines originating from France includes the attribute-value pair {Origin:France} 2020. That navigation state does not characterize all the wines in the collection that share the same attribute ({Origin}). For example, the navigation state that corresponds to the list of wines originating from Spain includes the attribute-value pair {Origin:Spain} 2025. Additionally, FIG. 20B shows a navigation state conjunctively defined by the attribute-value pairs {Origin:France AND Type/Varietal:Red} 2030. In the same example, another navigation state is defined by the attribute-value pair {Type/Varietal:White} 2040.

FIG. 21A, 21B, and 21C illustrate attributes 2112 and values 2114, arranged in accordance with partial order relationships that could be used for classifying wines. The attributes 2112 are Type/Varietal, Origin, and Vintage. Each attribute 2112 corresponds to a maximal term for that attribute. An attribute 2112 can have a flat set of mutually incomparable values (e.g., Vintage), a tree of values (e.g., Origin), or a general partial order that allows a value to refine a set of two or more mutually incomparable values (e.g., Type/Varietal). The arrows 2113 indicate the refinement relationships among values 2114.

The hierarchical search and navigation system typically will provide a user interface that allows the user to navigate through the navigation states. As discussed above, each navigation state is defined by an expression of terms, e.g., attribute-value pairs, and comprises the set of documents associated with those terms in accordance with that expression. Users can navigate through the collection of navigation states, for example, by conjunctively selecting and deselecting terms to obtain the navigation state corresponding to each expression of conjunctively selected terms. The user interface may present a navigation state by displaying both the list of terms and a list of some or all of the documents that correspond to that state. Also, the user interface may present the terms of the navigation state organized by attribute. The initial navigation state may be a root state that corresponds to no term selections and, therefore, to all of the documents in the collection.

The user interface allows users to narrow the navigation state by choosing a value for an attribute, or by replacing the currently selected value with a more specific one (if appropriate). The user interface may present users with the options available to narrow the present navigation state, with relevant terms organized by attribute. The user may be able to select values from lists that are organized by attributes in the current navigation state, or any other type of selection mechanism, such as pull-down menus, etc. The user interface may present these navigation options in a variety of formats. For example, values can be presented as pictures or as symbols rather than as text. The interface may allow for any method of selecting terms, e.g., mouse clicks, keyboard strokes, or voice commands. The interface may be provided through various media and devices, such as television or WWW, and telephonic or wireless devices. Although discussed herein primarily as a visual interface, the interface may also include an audio component or be primarily audio-based.

Preferably, in a present navigation state, the user interface only presents options for narrowing the navigation state that lead to a navigation state with at least one document. This preferred criteria for providing navigation options ensures that there are no "dead ends," or navigation states that correspond to an empty result set. Also, the user interface preferably only presents options for narrowing the navigation state if they lead to a navigation state with strictly fewer documents than the present one. Doing so ensures that the user interface does not present the user with choices that are already implied by terms in the current navigation state.

In general, the user may be presented with a number of methods of obtaining a desired navigation state, such as: (1) by conjunctively selecting terms, (2) by disjunctively selecting terms, (3) by negationally selecting terms, or (4) by entering a desired keyword in a search box.

For example, as noted above, users can navigate through the collection of navigation states to obtain a desired navigation state by conjunctively selecting and deselecting terms to obtain the navigation state corresponding to an expression of conjunctively selected terms. For some attributes, multiple incomparable (non-refining) conjunctive selections of values may be applicable. For example, in a wine collection database, for the attribute Flavor, the values Fruity and Nutty, neither of which refines the other, may both be conjunctively selected so that the terms Flavors: Fruity and Flavors: Nutty narrow the navigation state. Thus, users may sometimes be able to refine a query by conjunctively selecting multiple values under a single attribute.

The user may broaden the navigation state by disjunctively selecting additional terms. For example, in a movie collection database, a user could start at {Products: DVDs}, and then broaden by disjunctively selecting a term to {Products: DVDs OR Products: Videos}, and then narrow by conjunctively selecting a term to {(Products: DVDs OR Products: Videos) AND Director: Spike Lee}.

The user may narrow the navigation state by negationally selecting additional terms. For example, a user could start at {Products: DVDs}, narrow by conjunctively selecting a term to {Products: DVDs AND Genre: Comedy}, and then narrow by negationally selecting a term to {Products: DVDs AND Genre: Comedy AND (NOT Director: Woody Allen)}.

Figure 22:
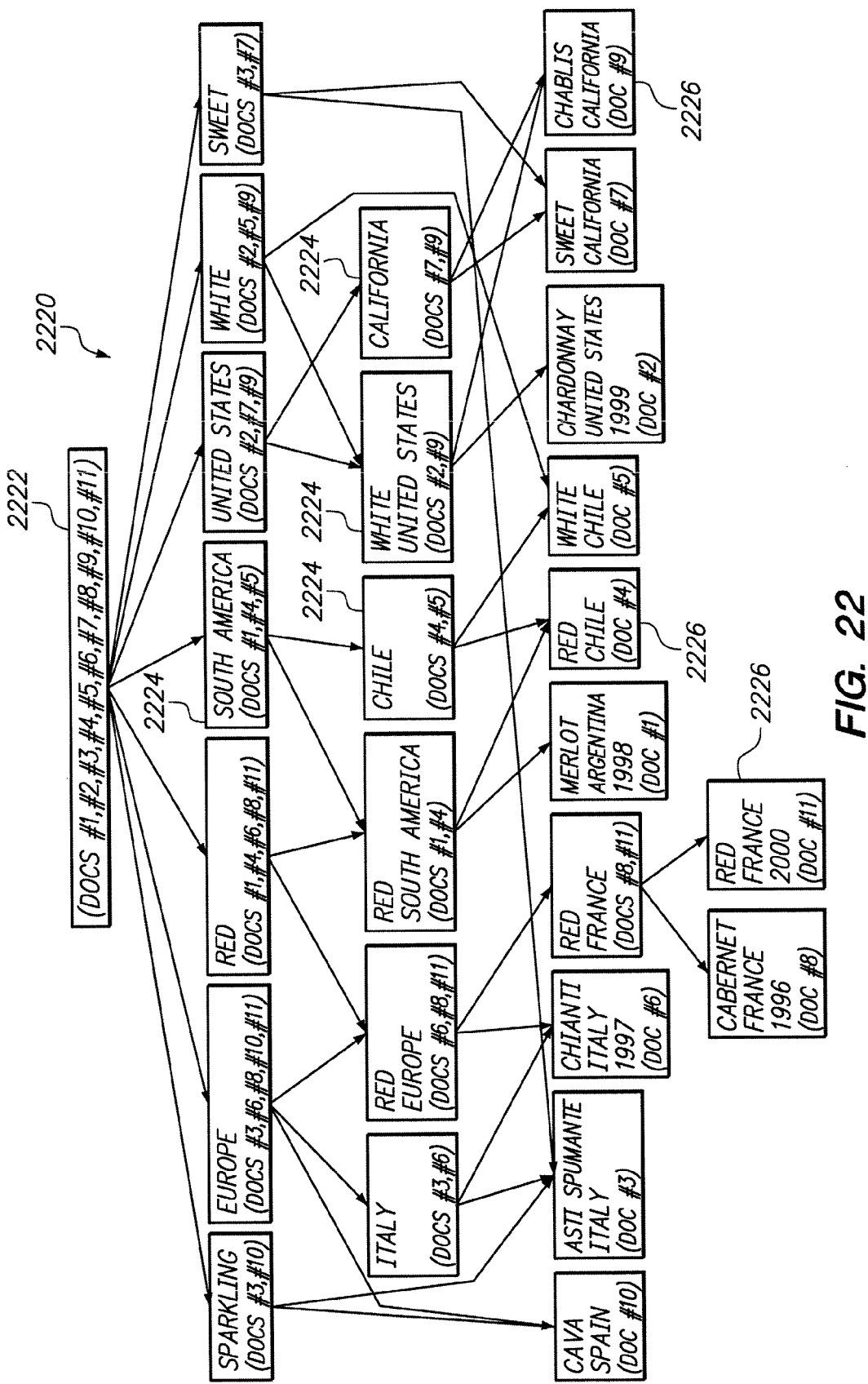
FIG. 22 is a representative partial order of navigation states.

FIG. 22 illustrates some conjunctive navigation states for the documents and terms based on the wine example discussed above. A conjunctive navigation state is a particular type of navigation state in which the term expression is conjunctive, that is, the expression combines terms using only the AND operator. Conjunctive navigation states are related by a partial order of refinement that is derived from the partial order that relates the terms. A conjunctive navigation state may correspond to a conjunctive expression of mutually incomparable terms. For example, one navigation state 2224 is {Origin: South America} (documents #1, #4, #5); a second navigation state 2224 is {Type/Varietal: White AND Origin: United States} (documents #2, #9). The subset of documents corresponding to a conjunctive navigation state includes the documents that are commonly associated with all of the terms in the corresponding expression of mutually incomparable terms. At the same time, the expression of mutually incomparable terms corresponding to a conjunctive navigation state includes all of the minimal terms from the terms that are common to the subset of documents, i.e., the terms that are commonly associated with every document in the subset. A conjunctive navigation state is preferably unique and fully specified—for a particular conjunctive expression of terms, or for a given set of documents, there is no more than one corresponding conjunctive navigation state.

One way to define the collection of conjunctive navigation states is to uniquely identify each conjunctive navigation state by a canonical conjunctive expression of mutually incomparable terms. A two-step mapping process that maps an arbitrary conjunctive expression of terms to a canonical conjunctive expression of mutually incomparable terms creates states that satisfy this property. In the first step of the process, an arbitrary conjunctive expression of terms is mapped to the subset of documents that are associated with all of those terms. Recalling that if a document is associated with a given term, then the document is also associated with all of the terms that the given term refines, in the second step of the process, this subset of documents is mapped to the conjunctive expression of minimal terms among the terms that are common to all of the documents in that document set. The result of this second step is a conjunctive expression of mutually incomparable terms that uniquely identifies the corresponding subset of documents, and, hence, is a canonical representation for a conjunctive navigation state. By way of illustration, referring to the wine example in FIG. 22, the term expression {Origin: France} maps to the subset of documents {documents #8, #11}, which in turn maps to the canonical term expression {Type/Varietal: Red AND Origin: France}.

The conjunctive navigation states 2222, 2224, 2226 are related by a partial order of refinement relationships 2220 derived from the partial order that relates terms. This partial order can be expressed in terms of either the subsets of documents or the term expressions that define a conjunctive navigation state. Expressed in terms of subsets of documents, a navigation state A refines a navigation state B if the set of documents that corresponds to state A is a subset of the set of documents that corresponds to state B. Expressed in terms of term expressions, a conjunctive navigation state A refines a conjunctive navigation state B if all of the terms in state B either are in state A or are refined by terms in state A. Referring to FIG. 22, the navigation state 2226 corresponding to the term expression {Type/Varietal: Red AND Origin: Chile} (document #4) refines the navigation state 2224 corresponding to {Origin: Chile} (documents #4, #5). Since the refinement relationships among navigation states give rise to a partial order, they are transitive and antisymmetric. In the example, {Type/Varietal: Red AND Origin: Chile} (document #4) refines {Origin: Chile} (documents #4, #5) and {Origin: Chile} (documents #4, #5) refines {Origin: South America} (documents #1, #4, #5); therefore, {Type/Varietal: Red AND Origin: Chile} (document #4) refines {Origin: South America} (documents #1, #4, #5). The root navigation state 2222 is defined to be the navigation state corresponding to the entire collection of documents. The leaf navigation states 2226 are defined to be those that cannot be further refined, and often (though not necessarily) correspond to individual documents. There can be an arbitrary number of intermediate navigation states 2224 between the root 2222 and the leaves 2226. Given a pair of navigation states A and B where B refines A, there can be multiple paths of intermediate navigation states 2224 connecting A to B in the partial order. For convenience of definition in reference to the implementation described herein, a navigation state is considered to refine itself.

Referring again to FIG. 1, the Rules Engine 135, as discussed above, allows an information provider, a user, or a third party to specify rules that manipulate search result content presentation through the use of rules, which comprise a trigger and one or more actions. The trigger is a predicate that identifies a set of conditions that, if satisfied, activate the rule. An action specifies how the system manipulates content presentation when the rule is activated. The information provider, user, or third party can create a group of rules, i.e., a rule script, that combines rules using sequential, conditional, or randomized logic.

Triggers may be defined in terms of expressions of attribute-value pairs. If the expressions of attribute-value pairs in the trigger correspond to valid navigation states in the search and navigation system, then the trigger is defined in terms of a set of navigation states that is a subset of the collection of all possible navigation states. The rule is activated when the current query, or the current navigation state responsive to that query, satisfies one or more of the expressions that make up the trigger. Triggers also may be defined in terms of one or more keywords. The rule is activated when the current query is a free-text query that includes the specified term or terms. In addition, at trigger may be based on a combination of navigation states and keywords. The following discussion provides examples of possible types of trigger expressions.

A trigger may specify conditions that correspond to a single navigation state. For example, a trigger might only be activated by an initial navigation state that a user first encounters while navigating the document collection. A rule with such a trigger might be used to push content likely to be of interest to most users, such as the set of documents recently added to the collection. In contrast, a trigger might only include a single navigation state that only a fraction of users are likely to encounter. A rule with such a trigger might be used to push content likely to be of interest to only that fraction of users, such as the option to navigate to a closely related navigation state. For example, in an application that represents movies in its collection of materials, a trigger might be activated by a single-term navigation state {Genre: Comedy}. Another trigger might be activated by the conjunctive 2-term navigation state {Genre: Comedy AND Release Year: 1980-1989}. Because the latter trigger is more specific than the first trigger, it can be useful to deliver more specific supplemental content.

A trigger may be configured to be activated by a plurality of navigation states. This flexibility allows designers of systems with large numbers of materials to avoiding the impracticality of writing a different rule for each navigation state. For example, a trigger can be activated by all possible navigation states. In addition, a trigger can be activated by some but not all of the possible navigation states. A plurality of navigation states can be identified without explicitly representing each navigation state. For example, a plurality of navigation states can be included by specifying a particular attribute-value pair and incorporating all navigation states with that attribute-value pair implicitly. For example, in an application that represents movies in its collection of materials, a trigger might be activated by all navigation states that include the term {Genre: Classics}, i.e., the single-term navigation state {Genre: Classics} as well multi-term navigation states like {Genre: Classics AND Release Year: 1980-1989}, {Genre: Classics OR Genre: Drama}.

A trigger may be defined in terms of the descendants of a given navigation state. Such a trigger designates a target subset of the document collection—either explicitly as a set of documents or implicitly by characterizing the navigation state—without enumerating every corresponding navigation state and causes the rule to be activated when the present query is associated with a set of documents that are contained by the target subset. For example, in an application that represents movies in its collection of materials, a trigger might be activated by navigation states that are descendants of the single-term navigation state {Genre: Classics}; the descendants include {Genre: Classics AND Release Year: 1980-1989} but not navigation states like {Genre: Classics OR Genre: Drama}, which is a generalizing rather than a narrowing refinement.

Similarly, a trigger may refer to the ancestors of a given navigation state, i.e., navigation states that represent generalizing refinements from the given navigation state. Such a trigger also designates a target subset of the document collection—either explicitly as a set of documents or implicitly by characterizing the navigation state—and causes the rule to be activated when the navigation state is associated with a set of documents that contain the documents in the target subset. In particular, such a rule could refer to navigation states that do not contain a document or plurality of documents. For example, in an application that represents movies in its collection of materials, a trigger might be activated by navigation states that are ancestors of the single-term navigation state {Genre: Romantic Comedy}; the ancestors include {Genre: Comedy}, but not navigation states like {Genre: Romantic Comedy AND NOT Director: Woody Allen}, which is a narrowing rather than a generalizing refinement.

A trigger may refer to the navigation states within a given distance of a given navigation state. For example, distance may be measured using a set difference function, such as the size of the symmetric difference between two sets of attribute-value pairs. In some embodiments, distance may be measured using a graph distance function, such as the length of the shortest path in the graph of navigation states. In some embodiments, distance may be measured using a dissimilarity measure, such as the measure described in co-pending patent application "Method and System for Similarity Search and Clustering."

A trigger may include Boolean operators like AND, OR, and NOT to specify an expression of attribute-value pairs, which may correspond to a navigation state or a plurality of navigation states. For example, in an application that representing movies as its collection of materials, a trigger might be activated by navigation states that are descendants of {Genre: Comedy} OR descendants of {Genre: Drama} AND are descendants of {Release Year: 1980-1989} but are NOT descendants of {Director: Woody Allen}.

A trigger may make use of a random or pseudorandom process. For example, a trigger can be specified so that even when the present navigation state otherwise satisfies the trigger the corresponding action is only performed some fraction of the time, based on the results of a random or pseudorandom number generator. In addition, the evaluation of a trigger may set or update variables that may be used by the rule's action or by subsequent rules. For example, in an application that represents movies as a collection of materials, a trigger might set a variable to be the "Director" term in the navigation state (if there is one), so that the action can push featured movies by that director.

As discussed above, the action component of a rule specifies one or more ways in which the system manipulates search result content presentation when that rule is activated. The following discussion provides examples of possible rule actions.

An action may specify that a document or a plurality of documents be included as supplemental content. The included document or plurality of documents may depend on the query that activated the rule's trigger or may be independent of that query. An action is considered to be dependent on the query if the document or plurality of documents that are considered for inclusion are restricted to the documents associated with the present navigation state that satisfies the query. For example, in an application that represents wines as a collection of materials, an action might specify the inclusion, as supplemental content, of a document corresponding to a featured wine associated with the current navigation state. In addition, the action of a rule may supplement a query response with navigation states, queries, or other content. In the user interface, the supplemental content may be offered as a separate section apart from the results of the query or may be integrated with the results of the query. Alternatively, the supplemental content may stand alone, i.e., the results displayed to the user may include only the results of a rules actions in lieu of the results of the original query.

An action may specify supplementing the result with options to navigate to one or more navigation states. The included navigation state or plurality of navigation states may depend on navigation state that activated the rule's trigger or may be independent of that navigation state. For example, the included navigation state or plurality of navigation states could be restricted to descendants of the navigation state that activated the rule's trigger. For example, in an application that represents wines as a collection of materials, an action incorporate as supplemental content the navigation state that narrows the current state by adding the term {Rating: 96-100}.

An action may not only provide the option to navigate to a navigation state, but also provide a preview of the results of using such an option to navigate. Such a preview could include a document or a plurality of documents, or some other information that summarizes or otherwise describes the navigation state or states in the supplemental content. For example, in an application that represents wines as a collection of materials, an action might incorporate as supplemental content a preview of the documents in the navigation state that narrows the current state by adding the term {Rating: 96-100}.

An action may specify text or graphics as supplemental content. Such text or graphics may serve to promote particular content or to fine-tune how the user experiences the content returned in response to the query. The text or graphics may depend on the navigation state that activated the rule's trigger or may be independent of that navigation state. For example, in an application that represents wines as a collection of materials, an action triggered by the inclusion of a term like {Price: Under $10} might incorporate as supplemental content text that says: "We have the best prices in the business!".

An action may specify how content presented to a user is logically or physically arranged. This arrangement may include sorting, aggregation, breaking up into discrete sections, geometric placement, or other arrangement details. The arrangement may depend on the navigation state that activated the rule's trigger or may be independent of that navigation state. For example, in an application that represents movies as a collection of materials, an action triggered by the inclusion of a term like {Price: Under $10} might present movies in the relevant navigation state sorted by price. In addition, an action may specify how content presented to a user is rendered. In the context of a visual user interface, rendering includes, for example, such considerations as font, size, and color. The rendering may depend on the navigation state that activated the rule's trigger or it may be independent of that navigation state. For example, in an application that representing wines as a collection of materials, an action might specify that documents corresponding to wines with a high ratio of rating to price be annotated with a text or graphics indicating: "best buys."

An action may specify the inclusion of a transformation of the query with the results. This transformation may modify the query by adding, removing, or replacing attribute-value pairs or keywords. The transformation can have the effect of narrowing or generalizing the query, or can have an effect that neither narrows not generalizes the query, but otherwise modifies the query received from the user, e.g., by replacing a attribute-value pair with a related attribute-value pair that neither narrows nor generalizes the given term, or by replacing a keyword with a related attribute-value pair. The query transformation may depend on the query or navigation state that activated the rule's trigger or may be independent of that query or navigation state. For example, in an application that represents wines as a collection of materials, an action might specify that a query that included "red" in a full-text search query will include {Type/Varietal: Red} as a term to generate a response to the query.

An action may specify the setting or updating of variables to be used by subsequent rules. In particular, an action may do nothing more than manipulate variables. Such manipulation may be useful for a rules script that uses conditional logic based on those variables. For example, a variable can be defined that stores the number of rules that have been triggered for a given navigation state. Such a variable would be incremented whenever a rule is triggered for that navigation state. A rules script might specify, using conditional logic, a maximum number of rules to trigger for a navigation state. It then could refer to this variable in the conditional logic to determine whether to evaluate additional rules or terminate the script for that navigation state.

The action of a particular rule may include a number of individual actions. These individual actions can be combinations of different types of actions supported by the rules engine in a particular embodiment. For example, the action of a particular rule may include: (1) identifying one type of supplemental content; (2) identifying a second type of supplemental content; (3) rendering the response to the query in a particular format; and (4) rendering the supplemental content in a different format. Of course, many other types of rule triggers and rule actions are possible.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims.

What is claimed is:

1. A computer-implemented method for modifying the results of a search performed in a collection of items by a search and navigation system, the method comprising:
   receiving a query from a user interface;
   determining a navigation state based on the received query, the navigation state being one of a plurality of navigation states which are defined by expressions of attribute-value pairs, such that for a first navigation state and a second navigation state, there are multiple paths of intermediate navigation states connecting the first navigation state and the second navigation state, and one method of navigation through the intermediate navigation states is achieved by a user interface that accepts both selecting and deselecting of any of the attribute-value pairs in an expression corresponding to the first navigation state to obtain an expression corresponding to the second navigation state or one of the intermediate navigation states, each selection and deselection forming a new query;
   retrieving, from the collection, items associated with the navigation state to form a set of unmodified search results, the set of unmodified search results having an arrangement for presentation to the user;
   applying a rule filter to a set of rules, prior to evaluation of a trigger for each rule, each rule comprising the trigger, an action, and metadata, and the rule filter comprising a metadata expression, wherein the applying of the rule filter to the set of rules comprises:
   evaluating the metadata expression of the rule filter based on the metadata of each rule; and
   passing rules for which the metadata expression of the rule filter evaluates as logical true;
   evaluating the trigger of each rule passed by the rule filter;
   executing the action of each rule for which the trigger of the rule evaluates as logical true, to modify the unmodified search results to form modified search results; and
   presenting the modified search results via the user interface.

2. The computer-implemented method of claim 1, wherein the rule filter is received from the user interface as part of the query and is applied only during a search based on the query.

3. The computer-implemented method of claim 2, wherein the rule filter metadata expression comprises a metadata property equated to a randomly assigned value that specifies a rule test set.

4. The computer-implemented method of claim 3, wherein the metadata of at least one of the rules comprises a value specifying a rule test set to which the rule belongs.

5. The computer-implemented method of claim 1, wherein the rule filter is received independently of the query and is applied for all received queries.

6. The computer-implemented method of claim 1, wherein:
   a first rule filter is received from the user interface as part of the query and is applied only during a search based on the query; and
   a second rule filter is received independently of the query and is applied for all received queries.

7. The computer-implemented method of claim 1, wherein the query is received from a user interface that accepts text input, in addition to accepting both selection and deselection of attribute-value pairs in an expression defining a current navigation state, each text input forming a new query.

8. The computer-implemented method of claim 1, wherein the query is formed based at least in part on a text input.

9. The computer-implemented method of claim 1, wherein the modified search results and the unmodified search results differ in arrangement.

10. The computer-implemented method of claim 9, wherein the action of at least one of the rules comprises an instruction for sorting the unmodified search results.

11. The computer-implemented method of claim 1, wherein the modified search results and the unmodified search results differ by at least one retrieved item.

12. The computer-implemented method of claim 11, wherein the action of at least one of the rules comprises an instruction for aggregating additional search results with the unmodified search results.

13. The computer-implemented method of claim 12, wherein the additional search results arise from an additional navigation state specified by the rule action.

14. The computer-implemented method of claim 12, wherein the additional search results arise from an additional query specified by the rule action.

15. The computer-implemented method of claim 1, wherein the action of at least one of the rules comprises an instruction for adding at least one of text and graphics to the unmodified search results for presentation to the user.

16. The computer-implemented method of claim 1, wherein the rule filter metadata expression comprises a metadata property equated to a value specifying a rule state.

17. The computer-implemented method of claim 16, wherein the metadata of at least one of the rules comprises a value specifying a state of the rule.

18. The computer-implemented method of claim 1, wherein the rule filter metadata expression comprises a disjunctive Boolean expression comprising a first metadata property equated to a value specifying a state of the rule and a second metadata property equated to a value specifying an identifier of the rule.

19. The computer-implemented method of claim 18, wherein the metadata of at least one of the rules comprises a value specifying a state of the rule and a value specifying an identifier of the rule.

20. The computer-implemented method of claim 1, wherein the rule filter metadata expression comprises a Boolean expression comprising a first metadata property equated to a value specifying a state of the rule and a second metadata property equated to a value specifying an author of the rule.

21. The computer-implemented method of claim 18, wherein the metadata of at least one of the rules comprises a value specifying a state of the rule and a value specifying an author of the rule.

22. The computer-implemented method of claim 1, wherein the rule filter metadata expression comprises a metadata property equated to a value specifying a merchandising campaign.

23. The computer-implemented method of claim 22, wherein the metadata of at least one of the rules comprises a value specifying a merchandising campaign for which the rule was created.

24. The computer-implemented method of claim 1, wherein the rule filter metadata expression comprises a metadata property equated to a value specifying a geographic region.

25. The computer-implemented method of claim 24, wherein the metadata of at least one of the rules comprises a value specifying a geographic region for which the rule was created.

26. A computer program product, residing on a computer-readable medium, for use in modifying the results of a search performed in a collection of items by a search and navigation system, the computer program product comprising instructions for causing a computer to perform the steps of:

receiving a query from a user interface;

determining a navigation state based on the received query, the navigation state being one of a plurality of navigation states which are defined by expressions of attribute-value pairs, such that for a first navigation state and a second navigation state, there are multiple paths of intermediate navigation states connecting the first navigation state and the second navigation state, and one method of navigation through the intermediate navigation states is achieved by a user interface that accepts both selecting and deselecting of any of the attribute-value pairs in an expression corresponding to the first navigation state to obtain an expression corresponding to the second navigation state or one of the intermediate navigation states, each selection and deselection forming a new query;

retrieving, from the collection, items associated with the navigation state to form a set of unmodified search results, the set of unmodified search results having an arrangement for presentation to the user;

applying a rule filter to a set of rules, prior to evaluation of a trigger for each rule, each rule comprising the trigger, an action, and metadata, and the rule filter comprising a metadata expression, wherein the applying of the rule filter to the set of rules comprises:

evaluating the metadata expression of the rule filter based on the metadata of each rule; and passing rules for which the metadata expression of the rule filter evaluates as logical true;

evaluating the trigger of each rule passed by the rule filter;

executing the action of each rule for which the trigger of the rule evaluates as logical true, to modify the unmodified search results to form modified search results; and presenting the modified search results via the user interface.

27. The computer program product of claim 26, wherein the rule filter is received from the user interface as part of the query and is applied only during a search based on the query.

28. The computer program product of claim 26, wherein the rule filter is received independently of the query and is applied for all received queries.

29. The computer program product of claim 26, wherein a first rule filter is received from the user interface as part of the query and is applied only during a search based on the query; and a second rule filter is received independently of the query and is applied for all received queries.

30. The computer program product of claim 26, wherein the query is received from a user interface that accepts text input, in addition to accepting both selection and deselection of attribute-value pairs in an expression defining a current navigation state, each text input forming a new query.

31. The computer program product of claim 26, wherein the query is formed based at least in part on a text input.

32. The computer program product of claim 26, wherein the rule filter metadata expression comprises a metadata property equated to a value specifying a rule state.

33. The computer program product of claim 26, wherein the rule filter metadata expression comprises a Boolean expression comprising a first metadata property equated to a value specifying a state of the rule and a second metadata property equated to a value specifying an author of the rule.

* * * * *